United States Patent
Peters

(10) Patent No.: US 10,976,716 B2
(45) Date of Patent: Apr. 13, 2021

(54) GENERATING A PLURALITY OF CURVED TRANSITIONS CONNECTING PLANAR PARALLEL ALTERNATING PATHS FOR FORMING A WORKPIECE

(71) Applicant: The Boeing Company, Chicago, IL (US)

(72) Inventor: Justin L. Peters, Alton, IL (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 15/923,641

(22) Filed: Mar. 16, 2018

(65) Prior Publication Data

US 2019/0286092 A1 Sep. 19, 2019

(51) Int. Cl.
| | | |
|---|---|---|
| *G05B 19/00* | (2006.01) | |
| *G05B 19/19* | (2006.01) | |
| *B21D 31/00* | (2006.01) | |
| *G05B 19/4099* | (2006.01) | |

(52) U.S. Cl.
CPC .......... *G05B 19/19* (2013.01); *B21D 31/005* (2013.01); *G05B 19/4099* (2013.01); *G05B 2219/40512* (2013.01)

(58) Field of Classification Search
CPC .................................................. B21D 31/005
USPC ....................................................... 700/192
See application file for complete search history.

(56) References Cited

U.S. PATENT DOCUMENTS

| | | | |
|---|---|---|---|
| 4,802,357 A | | 2/1989 | Jones |
| 5,888,037 A | * | 3/1999 | Fujimoto .............. G05B 19/416 408/1 R |
| 6,532,786 B1 | * | 3/2003 | Luttgeharm ........... B21D 22/16 72/115 |
| 8,783,078 B2 | | 7/2014 | Ren et al. |
| 9,409,349 B2 | | 8/2016 | Huskamp et al. |

FOREIGN PATENT DOCUMENTS

| | | | | |
|---|---|---|---|---|
| DE | 10144508 A1 | * | 5/2003 | ........... G05B 19/182 |
| JP | 2000089814 A | * | 3/2000 | |

OTHER PUBLICATIONS

Zhaobing Liu et al., "Tool path strategies and deformation analysis in multi-pass incremental sheet forming process", Jul. 23, 2014, Springer-Verlag London, vol. 75, No. 1, pp. 395-409 (Year: 2014).*
Kurra Suresh et al., "Tool path definition for numerical simulation of single point incremental forming", Nov. 13, 2013, Procedia Engineering, vol. 64, pp. 536-545 (Year: 2013).*
Inspire Automotive, "How to split large 3D objects for 3 axis CNC machining and 3D printing. (3 of 3)", Jul. 10, 2017, Youtube, https://www.youtube.com/watch?v=m5o6hPHzOVM (Year: 2017).*

(Continued)

*Primary Examiner* — Adam J Eiseman
*Assistant Examiner* — Dylan Schommer
(74) *Attorney, Agent, or Firm* — Yee & Associates, P.C.

(57) ABSTRACT

A method is presented. A tool path having planar parallel alternating paths connected by a plurality of curved transitions is generated. A forming tool is driven along the planar parallel alternating paths and the plurality of curved transitions to shape a material into a workpiece.

20 Claims, 23 Drawing Sheets

(56) References Cited

OTHER PUBLICATIONS

Sa'id Golabi et al., "Determining frustum depth of 304 stainless steel plates with various diameters and thicknesses by incremental forming", Apr. 27, 2014, Springer, vol. 28, pp. 3273-3278 (Year: 2014).*

Dirk Struik, "Differential Geometry in th e Large", Apr. 18, 1930, 49 (Year: 1930).*

Math Warehouse, "Equation of an Ellipse", Apr. 27, 2007, Math Warehouse, https://web.archive.org/web/20070427203311/https://www.mathwarehouse.com/ellipse/equation-of-ellipse.php (Year: 2007).*

Imre Paniti, "Robot-Based Incremental Sheet Forming", Jun. 11, 2012, Youtube, https://www.youtube.com/watch?v=xcg08U_Y4PI (Year: 2012).*

Rauch et al., "Tool path programming optimization for incremental sheet forming application," The ACM Digital Library, accessed Mar. 15, 2018, 2 pages. https://dl.acm.org/citation.cfm?id=1663670.1664154.

Haque, "Stress-Based Necking and Failure for Incremental Sheet Forming," Faculty of Science, Engineering and Technology, Swinburne University of Technology, 2014, 146 pages.

Maqbool et al., "A modular tooling set-up for incremental sheet forming (ISF) with subsequent stress-relief annealing under partial constraints," AIP Conference Proceedings, vol. 1896, Issue 1, 2017. Abstract only.

Behera et al., "Sequencing and Multi-Step Mesh Morphing Techniques," International Journal of Material Forming, Thematic Issue: Advanced Modeling and Innovative Processes, May 2014, 16 pages.

Extended European Search Report, dated Sep. 23, 2019, regarding Application No. 19162570.6, 8 pages.

Zhaobing et al., "Tool Path Strategies and Deformation Analysis in Multi-Pass Incremental Sheet Forming Process", The International Journal of Advanced Manufacturing Technology, Springer, London, vol. 75, No. 1, (2014) pp. 395-409.

Suresh et al., "Tool Path Definition for Numerical Simulation of Single Point Incremental Forming", Procedia Engineering, vol. 64, (2013) pp. 536-545.

European Examination Report dated Aug. 26, 2020 regarding EP Application No. 19162570.6; 8 pgs.

* cited by examiner

GENERATING A PLURALITY OF CURVED TRANSITIONS CONNECTING PLANAR PARALLEL ALTERNATING PATHS FOR FORMING A WORKPIECE

BACKGROUND INFORMATION

1. Field

The present disclosure relates generally to forming workpieces using a forming tool and a tool path. More specifically, the present disclose relates to forming a workpiece using a tool path having a plurality of curved transitions connecting planar parallel alternating paths.

2. Background

Incremental sheet forming is a forming technique in which a workpiece is created using incremental deformations of a sheet of material. Incremental sheet forming currently utilizes existing tool path algorithms developed for machining type operations. However, undesirable quality may result in workpieces formed using incremental sheet forming (ISF) and traditional machining tool paths.

Traditional tool path algorithms intersect the design by parallel horizontal planes that are perpendicular to the tool axis. Transition areas are present between the horizontal passes or levels. Undesirable surface quality may result in these transition areas of traditional toolpath algorithms. Surface quality may be especially impacted by transition areas for concave or convex workpieces.

Therefore, it would be desirable to have a method and apparatus that take into account at least some of the issues discussed above, as well as other possible issues. For example, it would be desirable to have an incremental machine forming algorithm configured to achieve desired quality of incrementally formed workpieces.

SUMMARY

An illustrative example of the present disclosure provides a method. A desired shape of a workpiece is divided into a plurality of layers stacked on top of one another. A first path that circumferentially traverses a fraction of a first layer of the plurality of layers and a second path that circumferentially traverses a fraction of a second layer of the plurality of layers are defined. A curved transition that joins the first path to the second path is calculated. A forming tool is driven along the first path, the curved transition, and the second path to shape a material into the workpiece.

Another illustrative example of the present disclosure provides a method. A tool path having planar parallel alternating paths connected by a plurality of curved transitions is generated. A forming tool is driven along the planar parallel alternating paths and the plurality of curved transitions to shape a material into a workpiece.

Yet another illustrative example of the present disclosure provides a system. The system comprises a model for a workpiece, a tool path generator, a controller, and a forming tool. The model comprises a desired shape of the workpiece. The tool path generator is configured to divide the desired shape of the workpiece into a plurality of layers stacked on top of one another, define a plurality of paths that each circumferentially traverses a fraction of a respective layer of the plurality of layers, calculate a plurality of curved transitions, wherein each curved transition of the plurality of curved transitions joins two respective paths of the plurality of paths. The controller is in communication with the tool path generator, wherein the controller is configured to drive the forming tool along the plurality of paths and the plurality of curved transitions to shape a material into the workpiece. The forming tool in communication with the controller.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
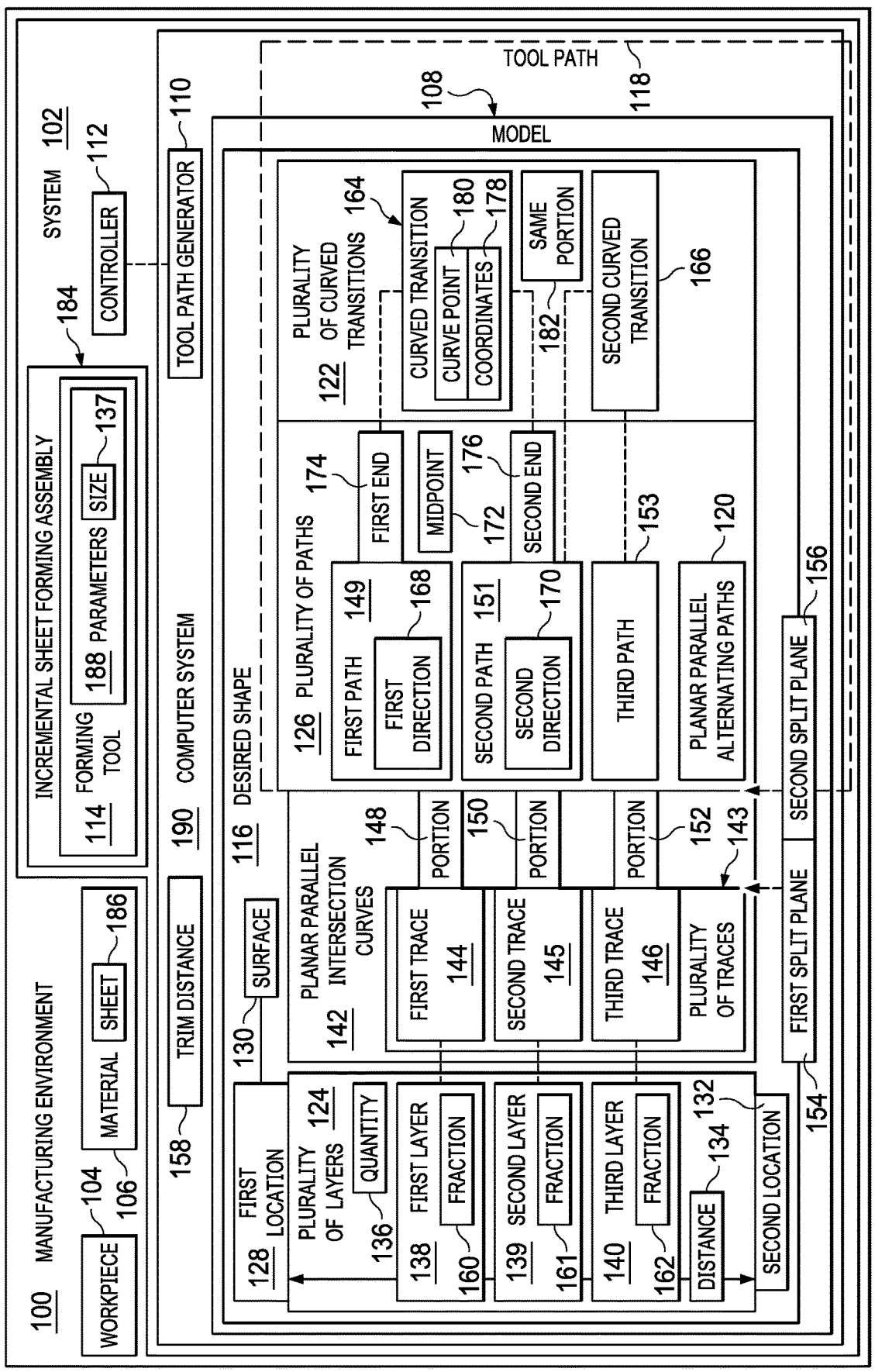
FIG. 1 is an illustration of a block diagram of a manufacturing environment in which a material is formed into a workpiece using a toolpath having a plurality of curved transitions connecting planar parallel alternating paths in accordance with an illustrative example.

The illustrative examples recognize and take into account one or more different considerations. For example, the illustrative examples recognize and take into account that some platforms, such as cars, aircraft, boats, or other platforms, may use replacement parts during maintenance and repair. The illustrative examples recognize and take into account that for older or less common platforms, small batches of replacement parts may need to be manufactured. For replacement parts, the original tools would be located, recalled from storage, cleaned, evaluated, and often repaired before they can be used for part production. The illustrative examples recognize and take into account that in some cases, the tools cannot be located or are not serviceable. The illustrative examples recognize and take into account that in these instances, new tools would be fabricated for a relatively short run of parts generating a high non-recurring expense that must be incurred to return the platform to service.

The illustrative examples recognize and take into account that the cost for manufacturing these small batch parts is both financial and in readiness of the platform. The illustrative examples recognize and take into account that delays in manufacturing the replacement components may create an undesirable delay in bringing the platform back to service.

The illustrative examples recognize and take into account that existing tool path algorithms for incremental sheet forming (ISF) were developed for machining type operations that remove material. The illustrative examples recognize and take into account that traditional CAM workbenches produce tool path algorithms that are suboptimal solutions for ISF.

The illustrative examples recognize and take into account that a bi-direction machining operations tool path typically has two types of transition solutions: simple point-to-point or a retract motions. The illustrative examples recognize and take into account that incremental sheet forming (ISF) today has limited bi-directional toolpath capability.

The illustrative examples recognize and take into account that traditional Z level machining workbench tool path algorithms may be used for a bi-directional toolpath. The illustrative examples recognize and take into account that Z level toolpath algorithms intersect the design by parallel horizontal planes that are perpendicular to the tool axis.

The illustrative examples recognize and take into account that traditional Z level toolpath algorithms have drawbacks in transitions areas of bi-directional passes and levels. The illustrative examples recognize and take into account that the bi-directional transition connection to the next level of the tool path motion is a simple point-to-point shortest path that does not follow curvature or mold line-like features of part geometry. The illustrative examples recognize and take into account that this type of shortest point-to-point toolpath algorithm may cause the machine to slow and change direction potentially causing jerk, acceleration, and deceleration in transitions. The illustrative examples recognize and take into account that the shortest point-to-point toolpath algorithm may create surface imperfections while forming on the physical part.

The illustrative examples recognize and take into account that helix and spiral toolpath algorithms promote continuous transition. The illustrative examples also recognize and take into account that helix and spiral toolpath algorithms are also limited to a single direction or one-way.

The illustrative examples recognize and take into account that currently there is no toolpath algorithm designed to produce continuous alternating curved transitions with mixed bi-directional tool paths to improve distortion and surface quality for (ISF) manufacturing operations.

The illustrative examples recognize and take into account that a toolpath algorithm to produce continuous alternating curved transitions with bi-directional tool paths may improve surface quality. The illustrative examples recognize and take into account that a toolpath algorithm to produce continuous alternating curved transitions with bi-directional tool paths may reduce distortion.

Referring now to the figures and, in particular, with reference to FIG. 1, an illustration of a block diagram of a manufacturing environment in which a material is formed into a workpiece using a toolpath having a plurality of curved transitions connecting planar parallel alternating paths is depicted in accordance with an illustrative example. Manufacturing environment 100 of FIG. 1 contains system 102 for forming workpiece 104 from material 106. System 102 comprises model 108 for workpiece 104, tool path generator 110, controller 112, and forming tool 114.

Model 108 for workpiece 104 comprises desired shape 116 for workpiece 104. Tool path generator 110 is configured to generate tool path 118 having planar parallel alternating paths 120 connected by plurality of curved transitions 122 from desired shape 116 for workpiece 104.

Tool path generator 110 is configured to divide desired shape 116 of workpiece 104 into plurality of layers 124 stacked on top of one another, define plurality of paths 126 that each circumferentially traverses a fraction of a respective layer of plurality of layers 124, and calculate plurality of curved transitions 122, wherein each curved transition of plurality of curved transitions 122 joins two respective paths of plurality of paths 126. When plurality of paths 126 are joined with plurality of curved transitions 122 to form tool path 118, the directions of plurality of paths 126 alternate as forming tool 114 progresses through tool path 118. Accordingly, plurality of paths 126 may also be referred to as planar parallel alternating paths 120.

In some illustrative examples, to divide desired shape 116 of workpiece 104 into plurality of layers 124, desired shape 116 is divided into substantially equal heights. As depicted, first location 128, which is on surface 130 of workpiece 104, is defined. First location 128 may be user defined or automatically generated by tool path generator 110. Second location 132 that is offset vertically from first location 128 is also defined. Distance 134 between first location 128 and second location 132 is calculated. Desired shape 116 of workpiece 104 is divided into substantially equal heights based on distance 134.

Quantity 136 of plurality of layers 124 is determined by distance 134 and set parameters. In some illustrative examples, quantity 136 of plurality of layers 124 is based on at least one parameter of forming tool 114. For example, quantity 136 of plurality of layers 124 may be based on size 137 of forming tool 114. As depicted plurality of layers 124 comprises first layer 138, second layer 139, and third layer 140. However, plurality of layers 124 may contain any desirable one of quantity 136.

Planar parallel intersection curves 142 are the intersection between plurality of layers 124 and desired shape 116. To define plurality of paths 126, planar parallel intersection curves 142 between where the plurality of layers 124 and desired shape 116 intersect are traced to form plurality of traces 143. As depicted, plurality of traces 143 comprises first trace 144, second trace 145, and third trace 146. First trace 144 is formed by tracing between where first layer 138 and desired shape 116 intersect. Second trace 145 is formed by tracing between where second layer 139 and desired shape 116 intersect. Third trace 146 is formed by tracing between where third layer 140 and desired shape 116 intersect.

A portion of each of plurality of traces 143 is removed to form plurality of paths 126. As depicted, portion 148 of first trace 144 is removed to form first path 149. As depicted, portion 150 of second trace 145 is removed to form second path 151. As depicted, portion 152 of third trace 146 is removed to form third path 153.

In some illustrative examples, removing the portion of each of plurality of traces 143 to form plurality of paths 126 comprises drawing first split plane 154 normal to plurality of traces 143 through plurality of traces 143, drawing second split plane 156 normal to plurality of traces 143 through plurality of traces 143, and removing a component of each of plurality of traces 143 between first split plane 154 and second split plane 156 to remove the portion of each of plurality of traces 143.

For example, as depicted, portion 148 of first trace 144 is positioned between first split plane 154 and second split plane 156. By removing the component of first trace 144 between first split plane 154 and second split plane 156, portion 148 is removed.

Also as depicted, portion 150 of second trace 145 is positioned between first split plane 154 and second split plane 156. By removing the component of second trace 145 between first split plane 154 and second split plane 156, portion 150 is removed.

As further depicted, portion 152 of third trace 146 is positioned between first split plane 154 and second split plane 156. By removing the component of third trace 146 between first split plane 154 and second split plane 156, portion 152 is removed.

In some illustrative examples, a distance between first split plane 154 and second split plane 156 is equivalent to trim distance 158. In these illustrative examples, the portions removed from plurality of traces 143 each have a length equivalent to trim distance 158. Trim distance 158 establishes a transitional gap between two consecutive layers of plurality of layers 124. Trim distance 158 is a set length for forming tool 114 to travel in transitioning between two consecutive layers of plurality of layers 124. In some illustrative examples, trim distance 158 is a parameter set by an operator. In other illustrative examples, trim distance 158 is automatically set by tool path generator 110.

By removing respective portions, such as portion 148, portion 150, and portion 152, from plurality of traces 143, plurality of paths 126 is formed. Plurality of paths 126 each circumferentially traverses a fraction of a respective layer of plurality of layers 124. For example, first path 149 circumferentially traverses fraction 160 of first layer 138. Second path 151 circumferentially traverses fraction 161 of second layer 139. Third path 153 circumferentially traverses fraction 162 of third layer 140.

After forming plurality of paths 126, plurality of curved transitions 122 is calculated, wherein each curved transition of plurality of curved transitions 122 joins two respective paths of plurality of paths 126. For example, curved transition 164 joins first path 149 and second path 151. As another example, second curved transition 166 joins second path 151 and third path 153.

Curved transition 164 forms a connection between first path 149 and second path 151 that forming tool 114 follows to shape material 106 without lifting forming tool 114 from material 106. Curved transition 164 enables forming tool 114 to be driven along first path 149 in first direction 168 and along second path 151 in second direction 170, opposite of first direction 168, without lifting forming tool 114 from material 106.

In some illustrative examples, calculating curved transition 164 that joins first path 149 to second path 151 comprises calculating midpoint 172 between first end 174 of first path 149 and second end 176 of second path 151. In some of these illustrative examples, after calculating midpoint 172, coordinates 178 for curve point 180 based on midpoint 172 are calculated. Curve point 180 may also be referred to as the extreme point of curvature. Curve point 180 is the furthest point on curved transition 164 relative to first end 174 and second end 176 of curved transition 164. In these illustrative examples, curved transition is drawn through first end 174, second end 176, and curve point 180. In some illustrative examples, curved transition 164 has an equal curvature between first end 174 and curve point 180 and between second end 176 and curve point 180. In some illustrative examples, curved transition 164 is symmetrical about a line drawn through midpoint 172 and curve point 180.

When curved transition 164 has an equal curvature between first end 174 and curve point 180 and between second end 176 and curve point 180, forming tool 114 transitions smoothly from first path 149 to second path 151. An equal curvature has less jerking or slow down for forming tool 114 than a non-uniform curvature between first end 174 and curve point 180 and between second end 176 and curve point 180.

Second curved transition 166 is depicted as connecting second path 151 and third path 153. During operation, forming tool 114 is driven in first direction 168 for both first path 149 and third path 153. Curved transition 164 and second curved transition 166 are oriented in opposite directions. In one illustrative example, curved transition 164 is oriented in first direction 168 while second curved transition 166 is oriented in second direction 170. Curved transition 164 and second curved transition 166 may also be described as opening in opposite directions.

In some illustrative examples, curved transition 164 and second curved transition 166 do not intersect. In some illustrative examples, although curved transition 164 and second curved transition 166 do not intersect, forming tool 114 contacts same portion 182 of material 106 while driving forming tool 114 along curved transition 164 and while driving forming tool 114 along second curved transition 166.

As depicted, system 102 comprises controller 112 in communication with tool path generator 110. Controller 112 may be implemented in at least one of hardware or software. Controller 112 may be a processor unit in a computer system or a specialist circuit depending on the particular implementation.

Controller 112 may be in communication with tool path generator 110 through any desirable wired or wireless means. Controller 112 is configured to drive forming tool 114 along plurality of paths 126 and plurality of curved transitions 122 to shape material 106 into workpiece 104. Controller 112 directs forming tool 114 using tool path 118 formed by tool path generator 110.

Forming tool 114 is in communication with controller 112 and takes any desirable form. In some illustrative examples, forming tool 114 may be referred to as a mandrel or a forming stylus. In some illustrative examples, forming tool 114 is a component of incremental sheet forming assembly 184. When forming tool 114 is a component of incremental sheet forming assembly 184, material 106 takes the form of sheet 186.

In some illustrative examples, tool path generator 110 generates tool path 118 having planar parallel alternating paths 120 connected by plurality of curved transitions 122 taking into account parameters 188 of forming tool 114. Parameters 188 may include any desirable parameters including, but not limited to, at least one of nominal diameter, corner radius, overall length, forming length, length with transition, or body diameter.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Driving forming tool 114 along planar parallel alternating paths 120 and plurality of curved transitions 122 shapes material 106 into workpiece 104. In some illustrative examples, forming tool 114 contacts a surface of all of material 106 of workpiece 104.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, although plurality of layers 124 comprises three layers, in other illustrative examples, quantity 136 may have any desirable value. Further, although model 108 and tool path generator 110 are shown on computer system 190 within manufacturing environment 100, in other illustrative examples, computer system 190 may be positioned outside of manufacturing environment 100. In other illustrative examples, tool path generator 110 and model 108 may be stored on different computing systems.

Figure 2:
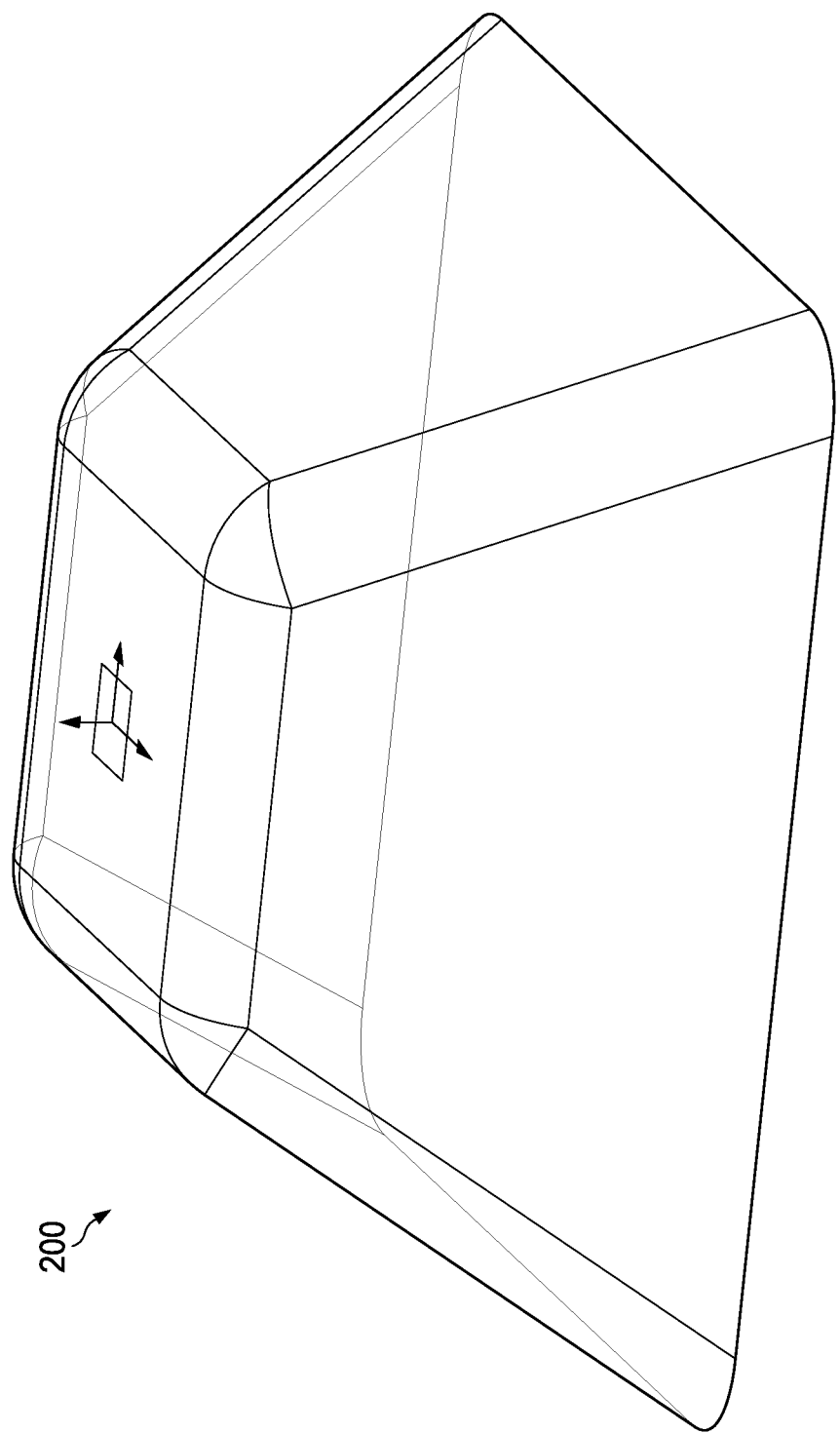
FIG. 2 is an illustration of an isometric view of a desired shape of a workpiece in accordance with an illustrative example.

Turning now to FIG. 2, an illustration of an isometric view of a desired shape of a workpiece is depicted in accordance with an illustrative example. Desired shape 200 is a physical implementation of desired shape 116 of FIG. 1. In some illustrative examples, desired shape 200 is a portion of a model, such as model 108 of FIG. 1. Desired shape 200 is used to form a tool path, such as tool path 118 of FIG. 1, to form a workpiece, such as workpiece 104 of FIG. 1.

As depicted, desired shape 200 is a truncated square pyramid with rounded edges. However, desired shape 200 may have any desirable shape or size. Although desired shape 200 is desired as symmetrical, in some illustrative examples, desired shape 200 may be asymmetrical.

Figure 3:
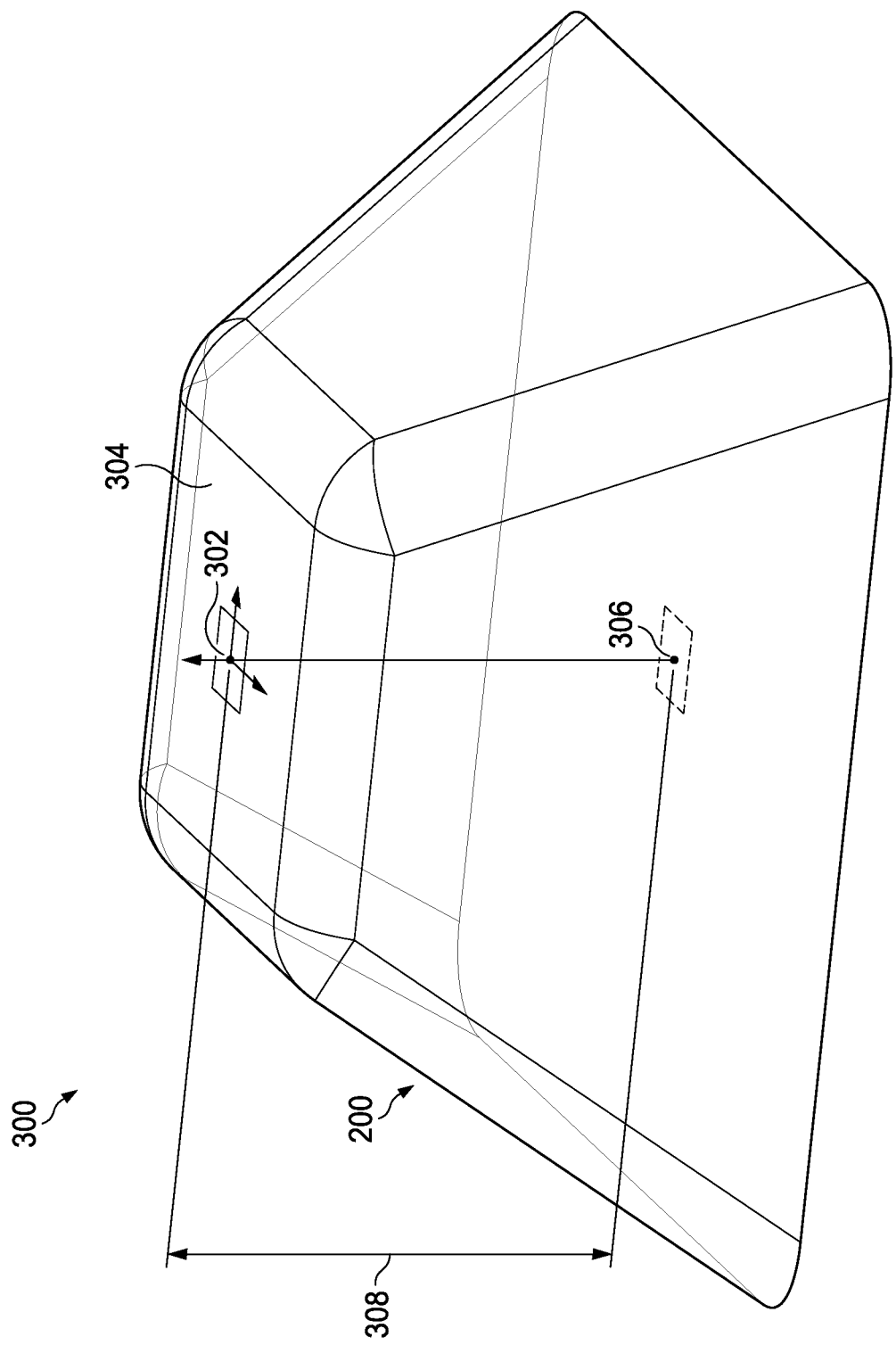
FIG. 3 is an illustration of an isometric view of a desired shape of a workpiece with an indicated distance between a first location and a second location in accordance with an illustrative example.

Turning now to FIG. 3, an illustration of an isometric view of a desired shape of a workpiece with an indicated distance between a first location and a second location is depicted in accordance with an illustrative example. In view 300, first location 302 on surface 304 of desired shape 200 is identified. In illustrative examples in which incremental sheet forming is used, first location 302 may be positioned on a topmost or bottommost portion of desired shape 200. In some illustrative examples, first location 302 is present on a defined top plane. The top plane may either be defined by an operator or by a tool path generator, such as tool path generator 110 of FIG. 1.

Second location 306, that is offset vertically from first location 302, is also identified in view 300. In some illustrative examples, second location 306 is normal to direction of top plane. In some illustrative examples, second location 306 is a defined point normal to the direction of the top plane. Second location 306 may be defined by either an operator or a tool path generator, such as tool path generator 110 of FIG. 1. Distance 308 between first location 302 and second location 306 is calculated.

Figure 4:
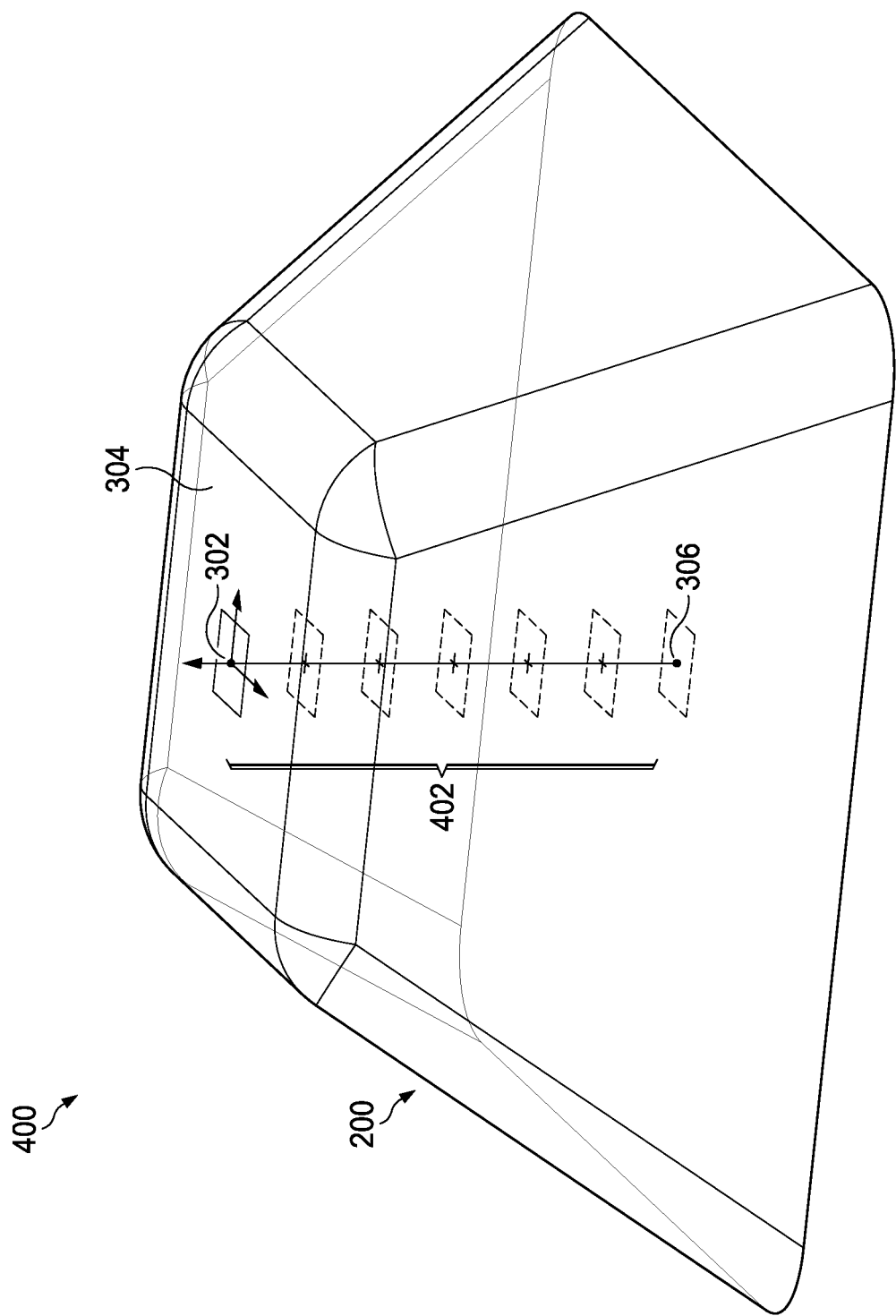
FIG. 4 is an illustration of an isometric view of a desired shape of a workpiece with a distance divided into a plurality of layers in accordance with an illustrative example.

Turning now to FIG. 4, an illustration of an isometric view of a desired shape of a workpiece with a distance divided into a plurality of layers is depicted in accordance with an illustrative example. In view 400, desired shape 200 has been divided into plurality of layers 402 based on distance 308 of FIG. 3 and any set parameters. For example, desired shape 200 may be divided into plurality of layers 402 based on a size of a forming tool (not depicted). As another example, desired shape 200 may be divided into plurality of layers 402 based on an input variable value of axial distance between passes. In some illustrative examples, axial distance between passes is operator generated. In other illustrative examples, axial distance between passes may be provided by a tool path generator, such as tool path generator 110 of FIG. 1.

Figure 5:
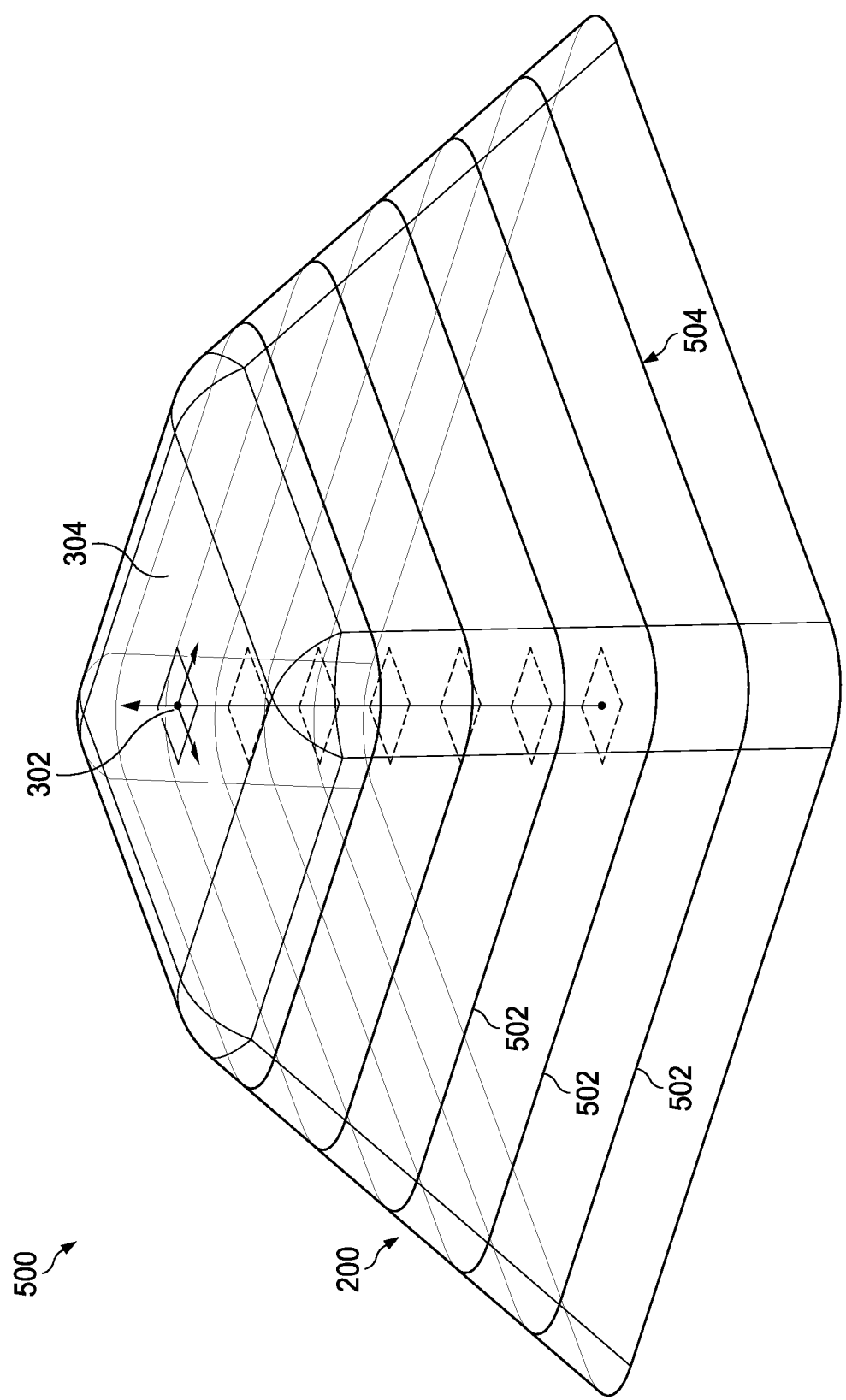
FIG. 5 is an illustration of an isometric view of a desired shape of a workpiece with planar parallel intersection curves traced in accordance with an illustrative example.

Turning now to FIG. 5, an illustration of an isometric view of a desired shape of a workpiece with planar parallel intersection curves traced is depicted in accordance with an illustrative example. In view 500, intersections between plurality of layers 402 of FIG. 2 and desired shape 200 are planar parallel intersection curves 502. Planar parallel intersection curves 502 are traced to form plurality of traces 504. Each of plurality of traces 504 is planar and parallel to each other trace of plurality of traces 504.

Figure 6:
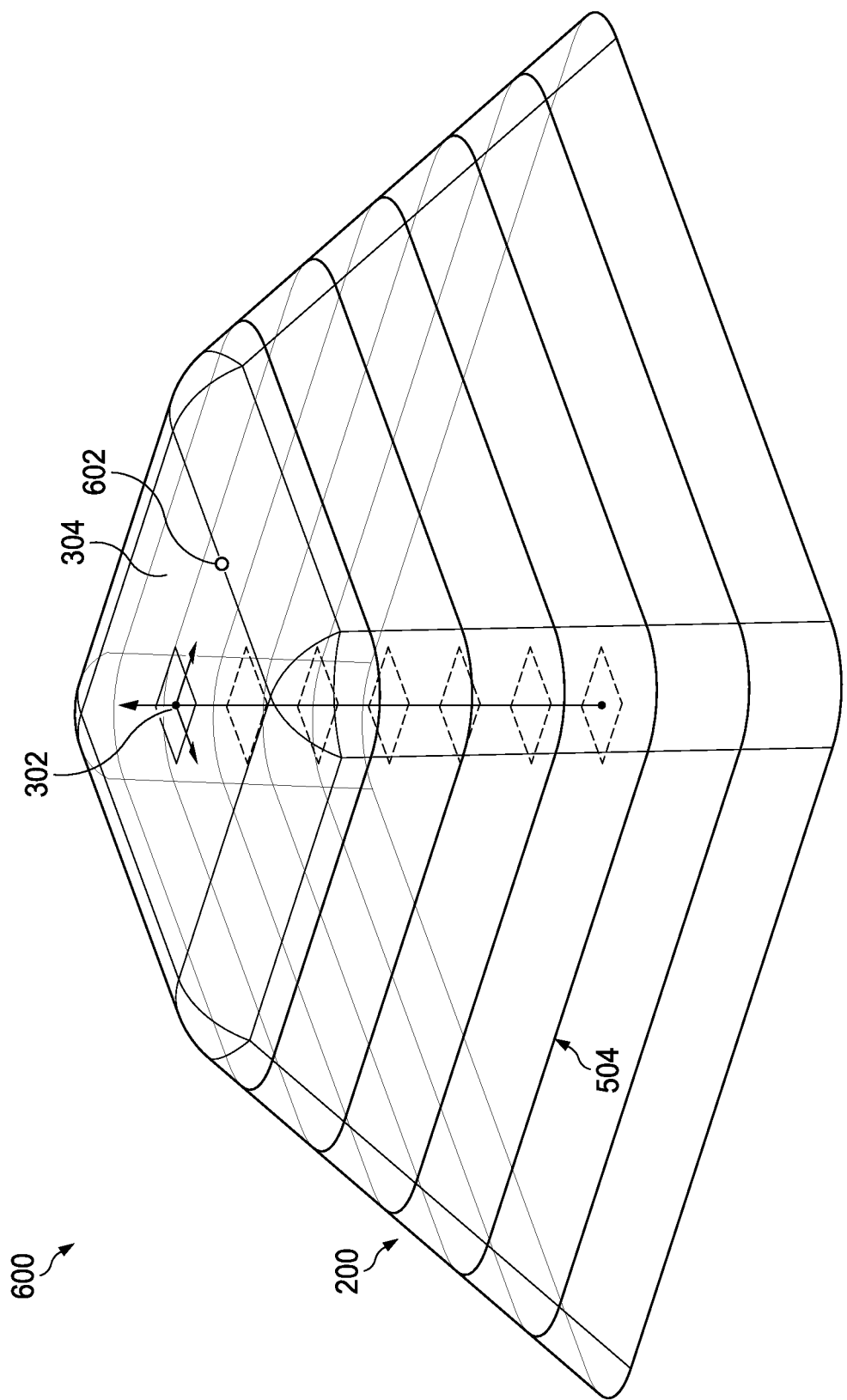
FIG. 6 is an illustration of an isometric view of a desired shape of a workpiece with a plurality of traces and a trim start point in accordance with an illustrative example.

Turning now to FIG. 6, an illustration of an isometric view of a desired shape of a workpiece with a plurality of traces and a trim start point is depicted in accordance with an illustrative example. In view 600, plurality of traces 504 are visible on desired shape 200. Trim start point 602 is identified in view 600. In some illustrative examples, trim start point 602 is user defined. In some illustrative examples, trim start point 602 is generated by a tool path generator, such as tool path generator 110 of FIG. 1. In all illustrative examples, trim start point 602 resides on an uppermost trace of plurality of traces 504.

Figure 7:
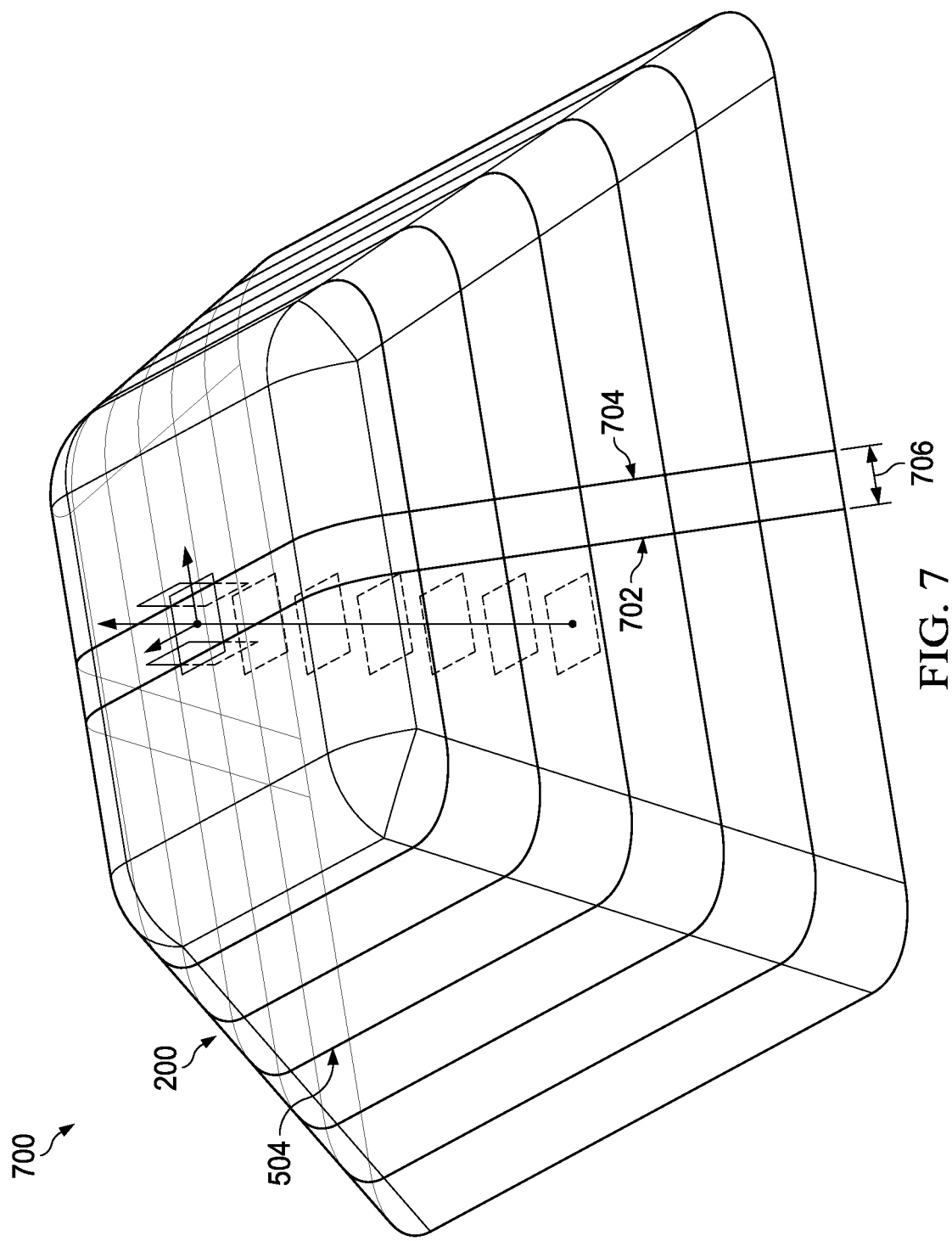
FIG. 7 is an illustration of an isometric view of a desired shape of a workpiece with a plurality of traces and a first split plane and a second split plane normal to the plurality of traces in accordance with an illustrative example.

Turning now to FIG. 7, an illustration of an isometric view of a desired shape of a workpiece with a plurality of traces and a first split plane and a second split plane normal to the plurality of traces is depicted in accordance with an illustrative example. In view 700, first split plane 702 and second split plane 704 are depicted on desired shape 200.

First split plane 702 has an orientation normal to plurality of traces 504 and through plurality of traces 504. First split plane 702 also extends through coordinates of trim start point 602 of FIG. 6. Second split plane 704 is normal to plurality of traces 504 and extends through plurality of traces 504. Second split plane 704 is distance 706 apart from first split plane 702. In some illustrative examples, distance 706 is based upon a defined trim distance, such as trim distance 158 of FIG. 1. The trim distance may be user defined or set by a tool path generator, such as tool path generator 110 of FIG. 1.

Figure 8:
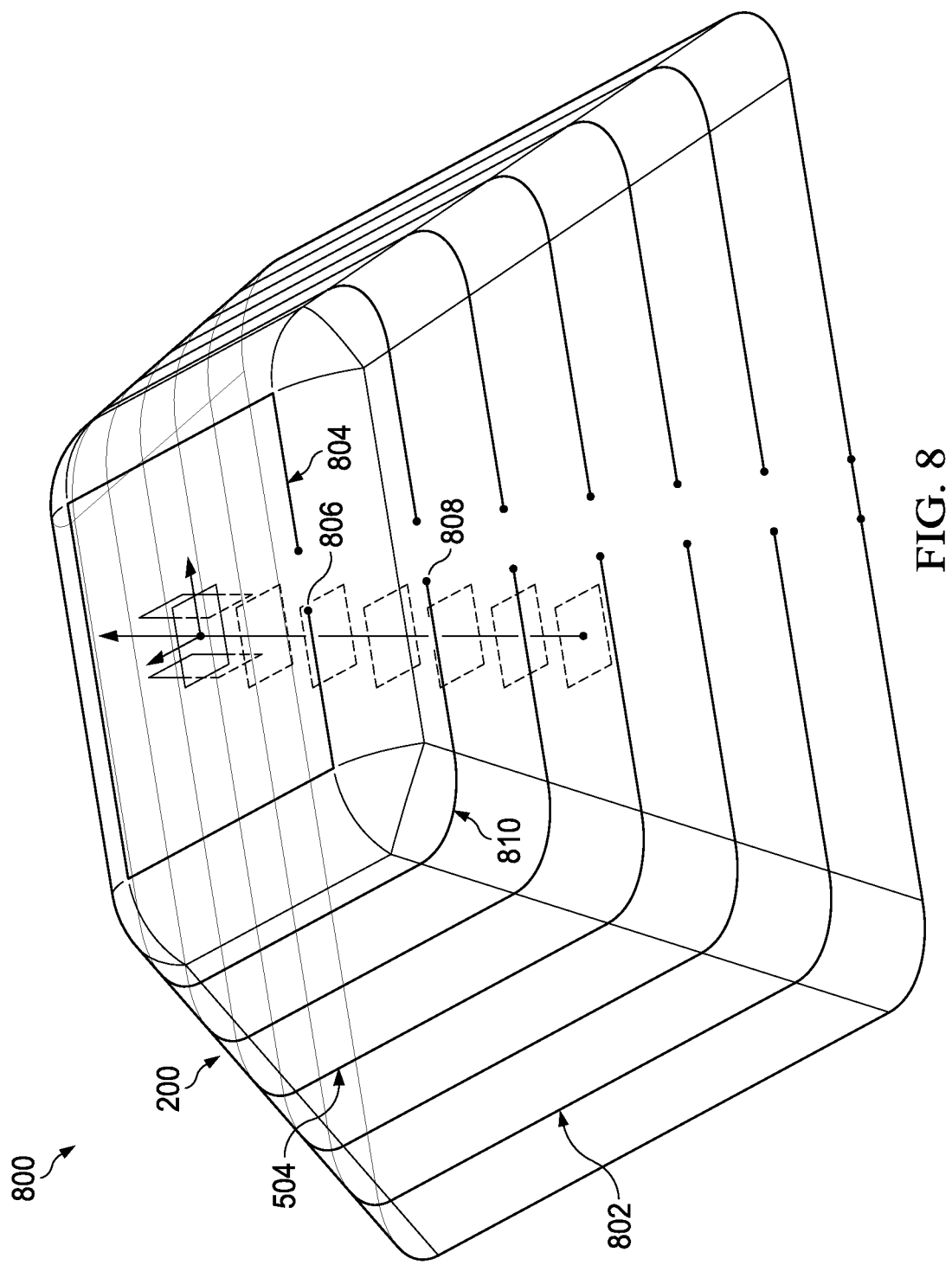
FIG. 8 is an illustration of an isometric view of a desired shape of a workpiece with a plurality of paths that each circumferentially traverses a fraction of a respective layer of the plurality of layers in accordance with an illustrative example.

Turning now to FIG. 8, an illustration of an isometric view of a desired shape of a workpiece with a plurality of paths that each circumferentially traverses a fraction of a respective layer of the plurality of layers is depicted in accordance with an illustrative example. In view 800, a portion of each of plurality of traces 504 has been removed to form plurality of paths 802. More specifically, a component of each of plurality of traces 504 between first split plane 702 and second split plane 704 of FIG. 7 has been removed. Each of plurality of paths 802 circumferentially traverses a fraction of a respective layer of plurality of layers 402. Each of plurality of paths 802 has two respective ends. For example, first path 804 has first end 806 to be connected to second end 808 of second path 810.

Figure 9:
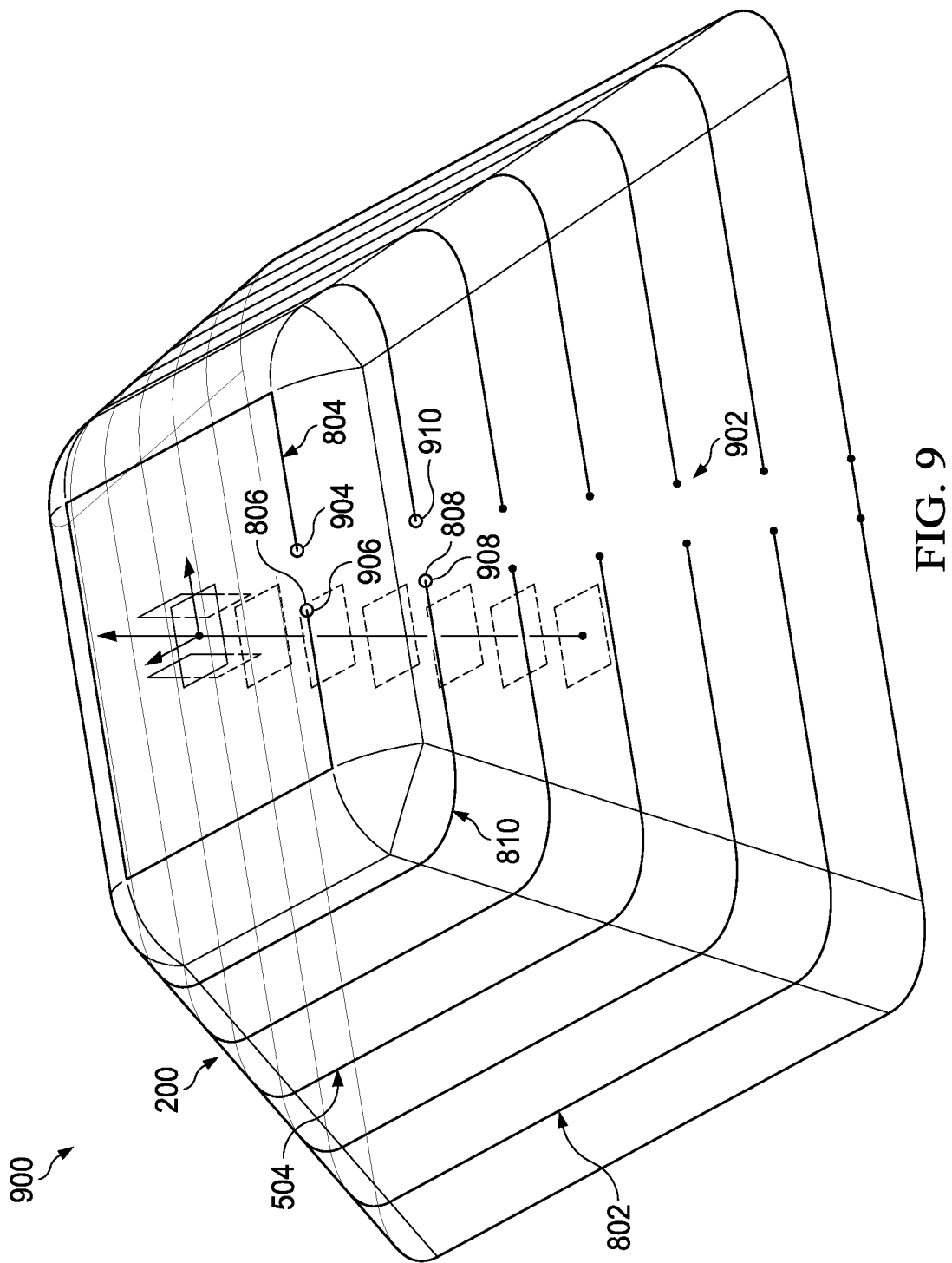
FIG. 9 is an illustration of an isometric view of a desired shape of a workpiece with a plurality of paths and identified end points in accordance with an illustrative example.

Turning now to FIG. 9, an illustration of an isometric view of a desired shape of a workpiece with a plurality of paths and identified end points is depicted in accordance with an illustrative example. In view 900, end points 902 have been added to plurality of paths 802. First path 804 has start point 904 and end point 906. Second path 810 has start point 908 and end point 910. As depicted, end point 906 is first end 806 of first path 804. As depicted, start point 908 of second path 810 is second end 808 of second path 810. Although only four end points are shown in end points 902, in practice, end points are identified for all of desired shape 200.

Figure 10:
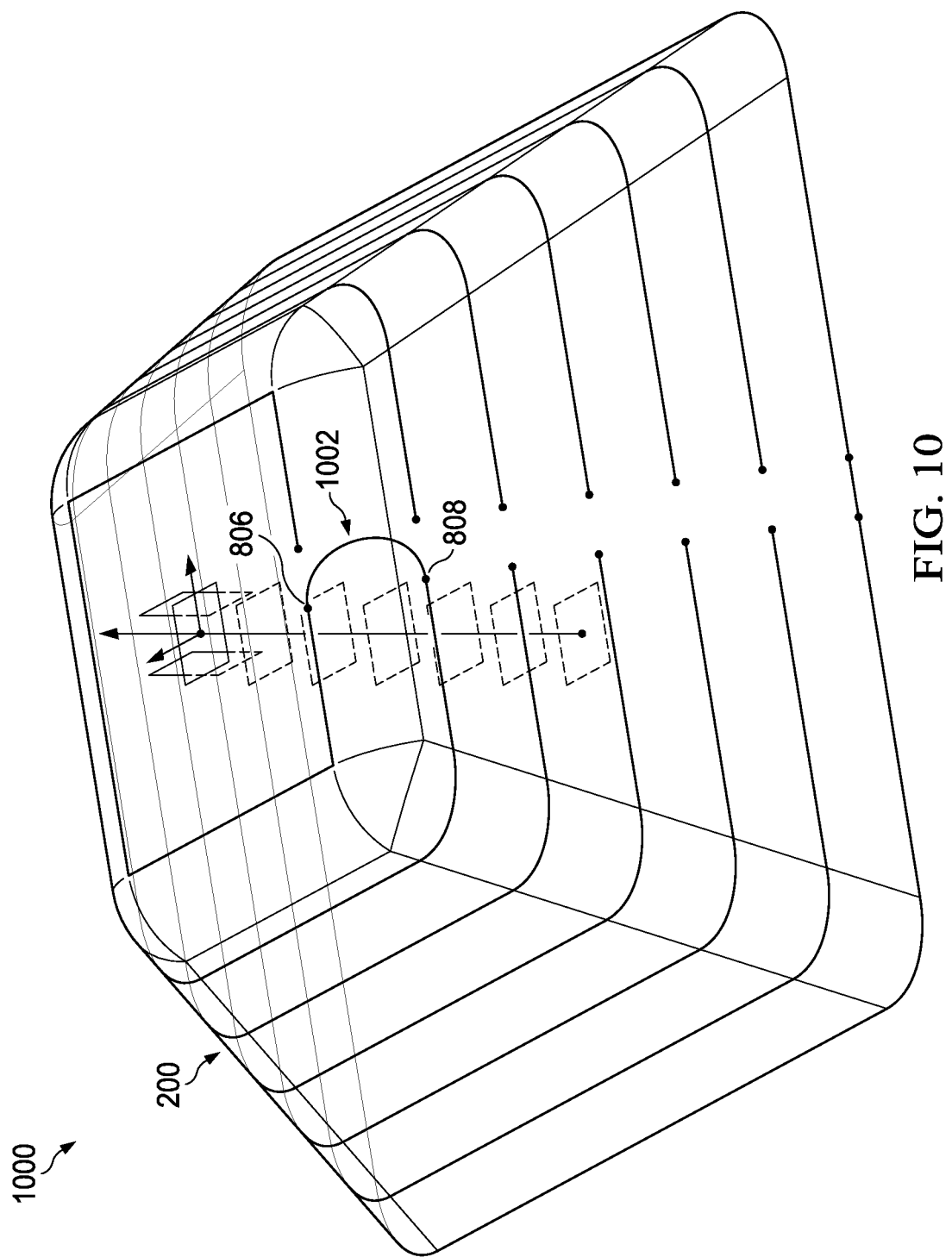
FIG. 10 is an illustration of an isometric view of a desired shape of a workpiece with a plurality of paths and a curved transition in accordance with an illustrative example.

Turning now to FIG. 10, an illustration of an isometric view of a desired shape of a workpiece with a plurality of paths and a curved transition is depicted in accordance with an illustrative example. In view 1000, curved transition 1002 connects first end 806 of first path 804 and second end 808 of second path 810. Curved transition 1002 allows a forming tool (not depicted) to travel along first path 804 and second path 810 in alternating directions without removing the forming tool from the surface of the material (not depicted).

Figure 11:
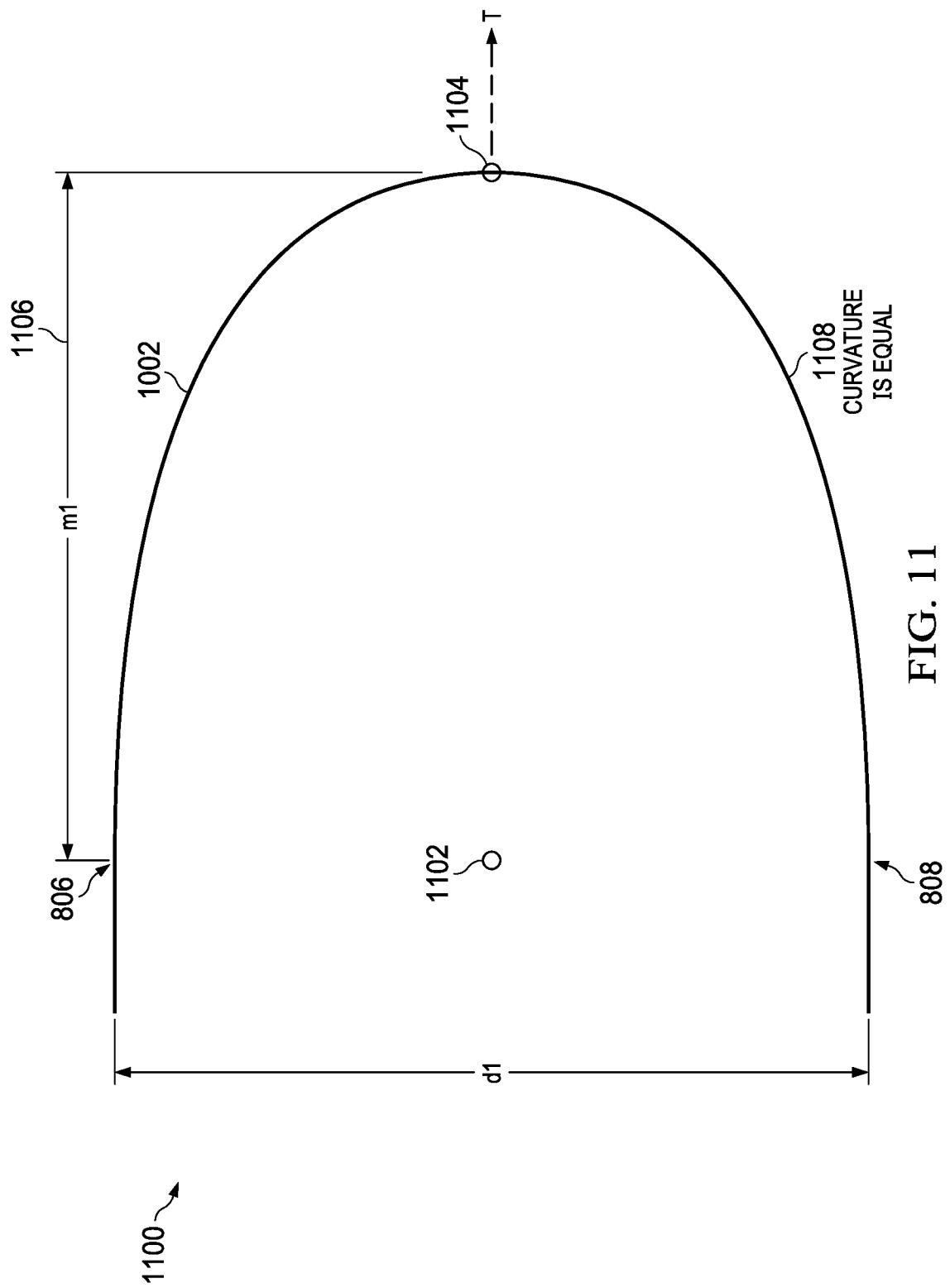
FIG. 11 is an illustration of a curved transition between a first end and a second end of a plurality of paths in accordance with an illustrative example.

Turning now to FIG. 11, an illustration of a curved transition between a first end and a second end of a plurality of paths is depicted in accordance with an illustrative example. View 1100 is a marked up view of curved transition 1002 of FIG. 10 to provide an illustrative example of creating curved transition 1002.

Midpoint 1102 between first end 806 of first path 804 and second end 808 of second path 810 is calculated. Coordinates for curve point 1104 are calculated based on midpoint 1102. The coordinates for curve point 1104 may also be referred to as "offset point coordinates," as curve point 1104 is offset from midpoint 1102. Curved transition 1002 is drawn through first end 806, second end 808, and curve point 1104.

In some illustrative examples, midpoint 1102 is calculated as $$dx_1 = \frac{ex_1 + sx_2}{2}, dy_1 = \frac{ey_1 + sy_2}{2}, dz_1 = \frac{ez_1 + sz_2}{2}.$$

Parameters for the calculations, such as spline transition parameters, are provided by either an operator or the tool path generator, such as tool path generator 110 of FIG. 1. The spline transition parameters include where T, as an integer, changes the length of the spline.

As depicted, a constant of tension as percentage K is used to calculate displacement value 1106 of curve point 1104 as $m_1 = (d_1 * T)/K$. Curve point 1104 may also be referred to as the extreme point of curvature. Curve point 1104 is the furthest point on a curve relative to the starting and ending points of the curve. As depicted, curve point 1104 is the furthest point on curved transition 1002 relative to first end 806 and second end 808. The vector magnitude, $v_1$, is calculated from first split plane 702 of FIG. 7, using $v_1 = \sqrt{(si1^2 + sj1^2 + sk1^2)}$.

Direction is converted into a unit vector using $$\left(ui_1 = \left(\frac{si_1}{v_1}\right), uj_1 = \left(\frac{sj_1}{v_1}\right), uk_1 = \left(\frac{sk_1}{v_1}\right)\right).$$

The displacement vector is calculated using $vi_1 = m_1 * ui_1$, $vj_1 = m_1 * uj_1$, $vk_1 = m_1 * uk_1$. The coordinates for curve point 1104 are calculated using $cx_1 = dx_1 + vi_1$, $cy_1 = dy_1 + vj_1$, $cz_1 = dz_1 + vk_1$. Afterwards, curved transition 1002 is drawn through first end 806, second end 808, and curve point 1104. As depicted, curved transition 1002 has equal curvature 1108 between first end 806 and curve point 1104 and between second end 808 and curve point 1104. As depicted, curved transition 1002 is symmetrical about a line drawn through midpoint 1102 and curve point 1104.

Figure 12:
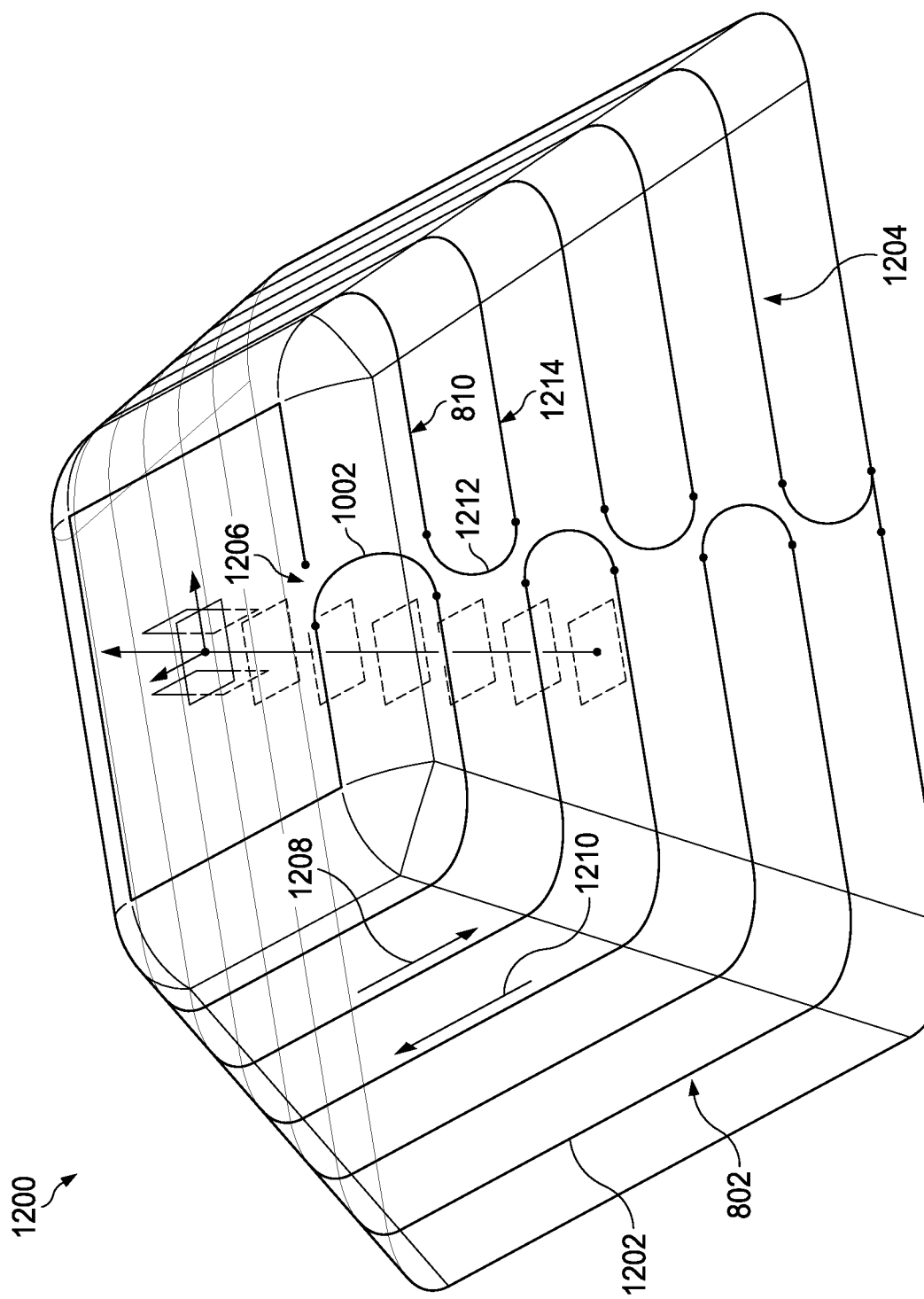
FIG. 12 is an illustration of an isometric view of a desired shape of a workpiece with a tool path having planar parallel alternating paths connected by a plurality of curved transitions in accordance with an illustrative example.

Turning now to FIG. 12, an illustration of an isometric view of a desired shape of a workpiece with a tool path having planar parallel alternating paths connected by a plurality of curved transitions is depicted in accordance with an illustrative example. In view 1200, tool path 1202 having planar parallel alternating paths 1204 and plurality of curved transitions 1206 is shown on desired shape 200. As depicted, plurality of paths 802 are planar parallel alternating paths 1204 in which a forming tool (not depicted) will move in first direction 1208 or second direction 1210 in an alternating fashion. Plurality of curved transitions 1206 may be created by repeating the steps described with regard to FIG. 11 above.

Plurality of curved transitions 1206 connect planar parallel alternating paths 1204 so that the forming tool may move in alternating directions without being removed from the material (not depicted). Plurality of curved transitions 1206 includes curved transition 1002 of FIG. 10. Plurality of curved transitions 1206 also includes second curved transition 1212. Second curved transition 1212 joins second path 810 and third path 1214.

Curved transition 1002 and second curved transition 1212 are oriented in opposite directions. Curved transition 1002 and second curved transition 1212 may also be described as opening in opposite directions.

As depicted, curved transition 1002 and second curved transition 1212 do not intersect. In some illustrative examples, although curved transition 1002 and second curved transition 1212 do not intersect, a forming tool (not depicted) contacts a same portion of material while driving the forming tool along curved transition 1002 and while driving the forming tool along second curved transition 1212.

As depicted, plurality of curved transitions 1206 do not intersect. However, in some illustrative examples when a forming tool (not depicted) is driven along tool path 1202, the forming tool may travel over parts of a material more than once due to the size of the forming tool. In these illustrative examples, by performing overlapping passes with the forming tool, all of material will be formed.

Figure 13:
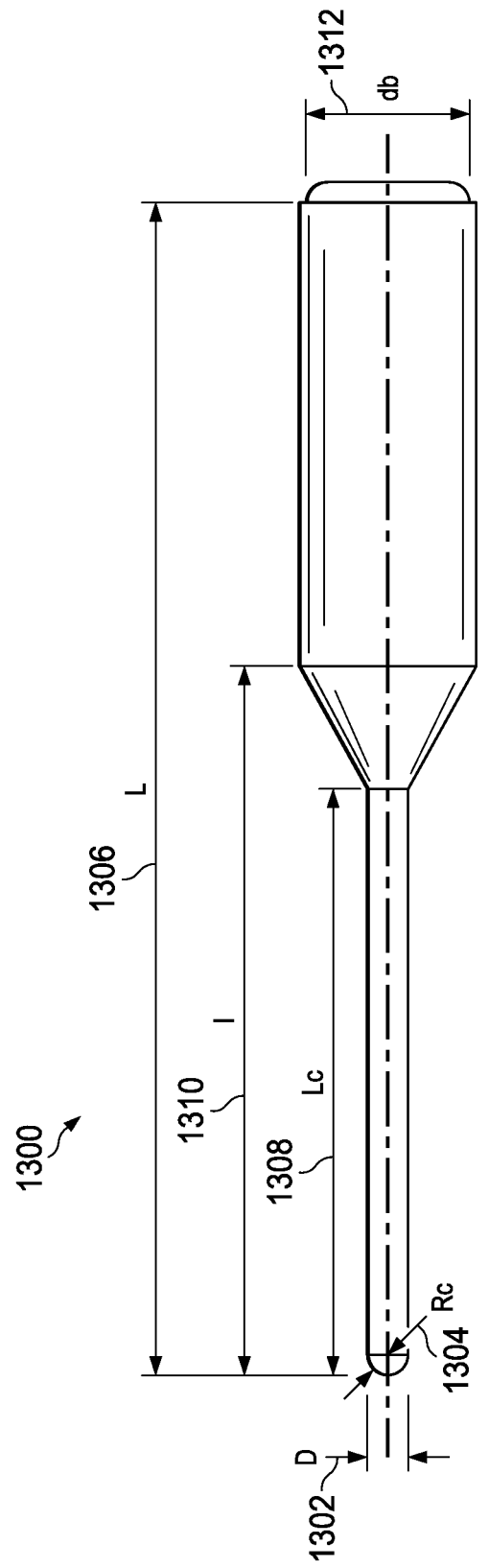
FIG. 13 is an illustration of a side view of a forming tool in accordance with an illustrative example.
Figure 14A:
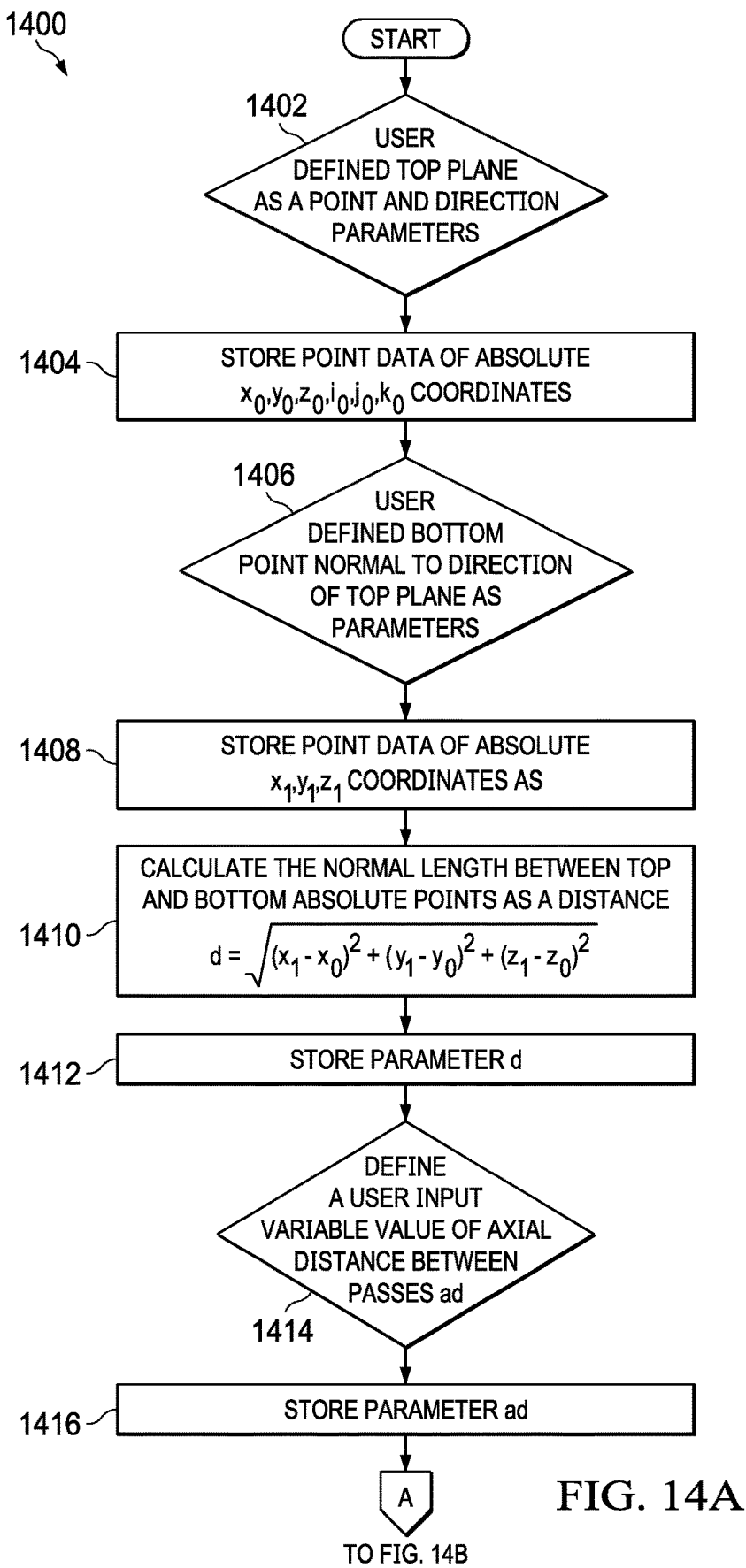
FIGS. 14A, 14B, 14C, 14D, and 14E are an illustration of a flowchart of a method for forming a toolpath having a plurality of curved transitions connecting planar parallel alternating paths for forming a workpiece in accordance with an illustrative example.
Figure 14B:
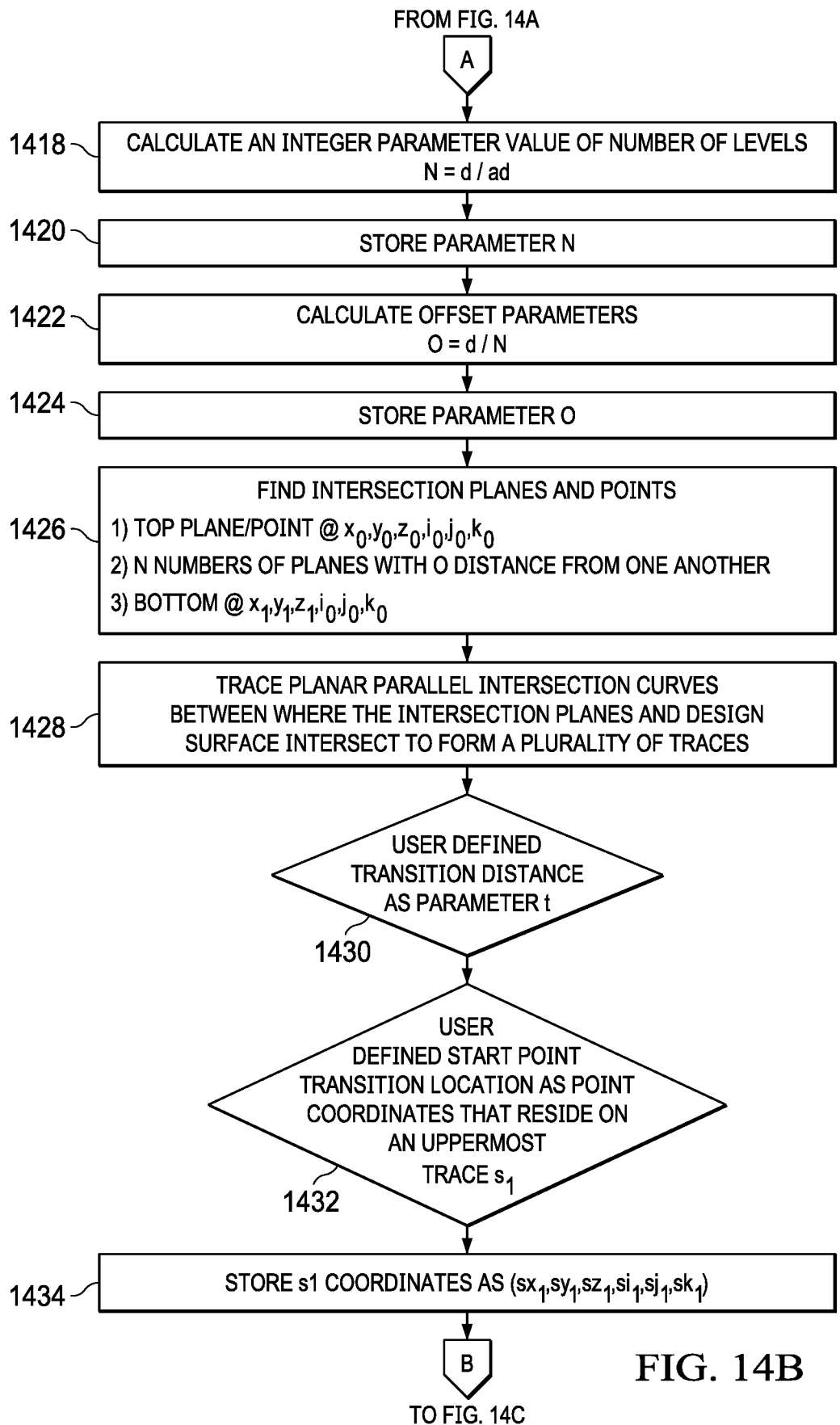
Figure 14C:
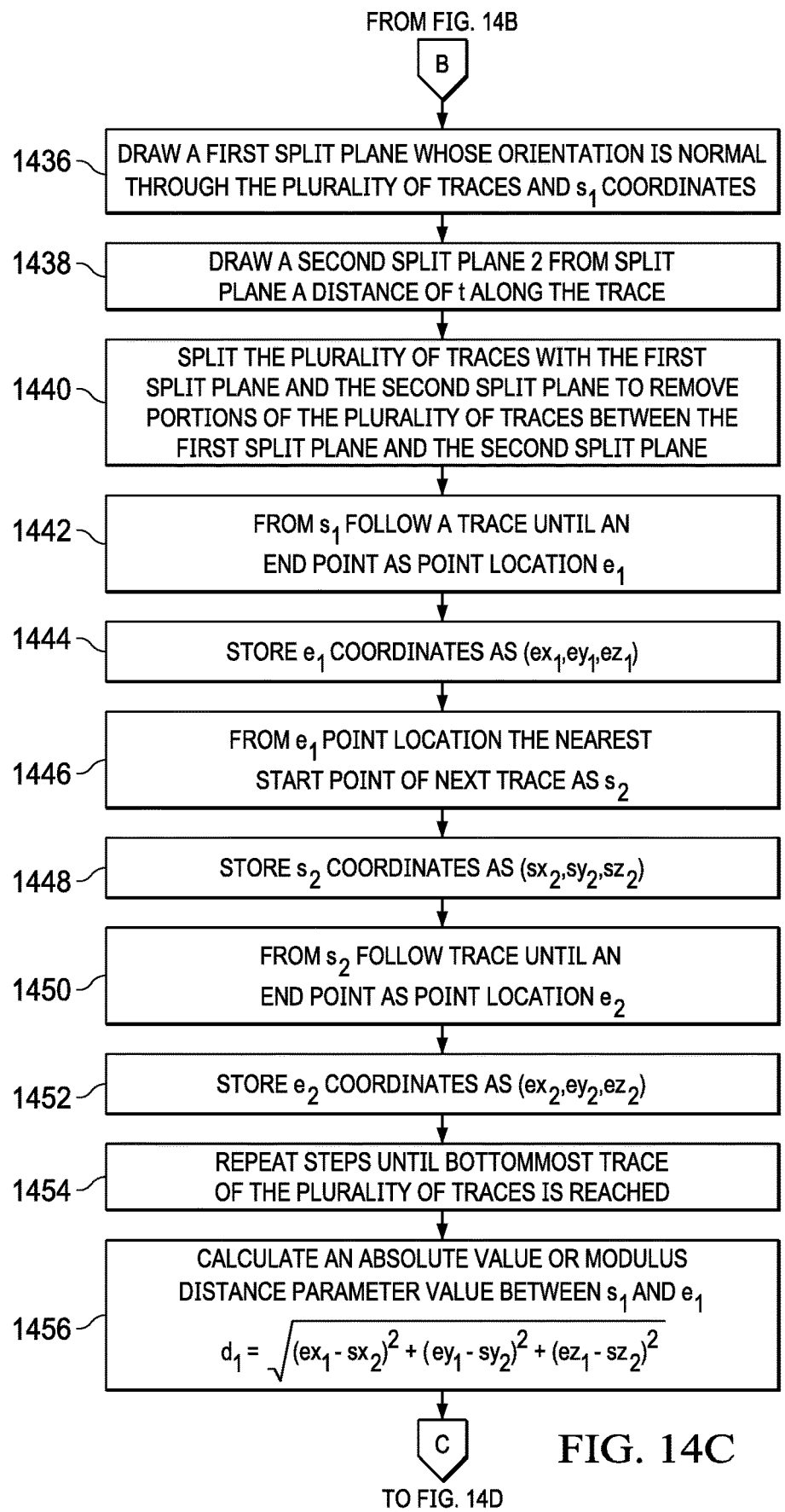
Figure 14D:
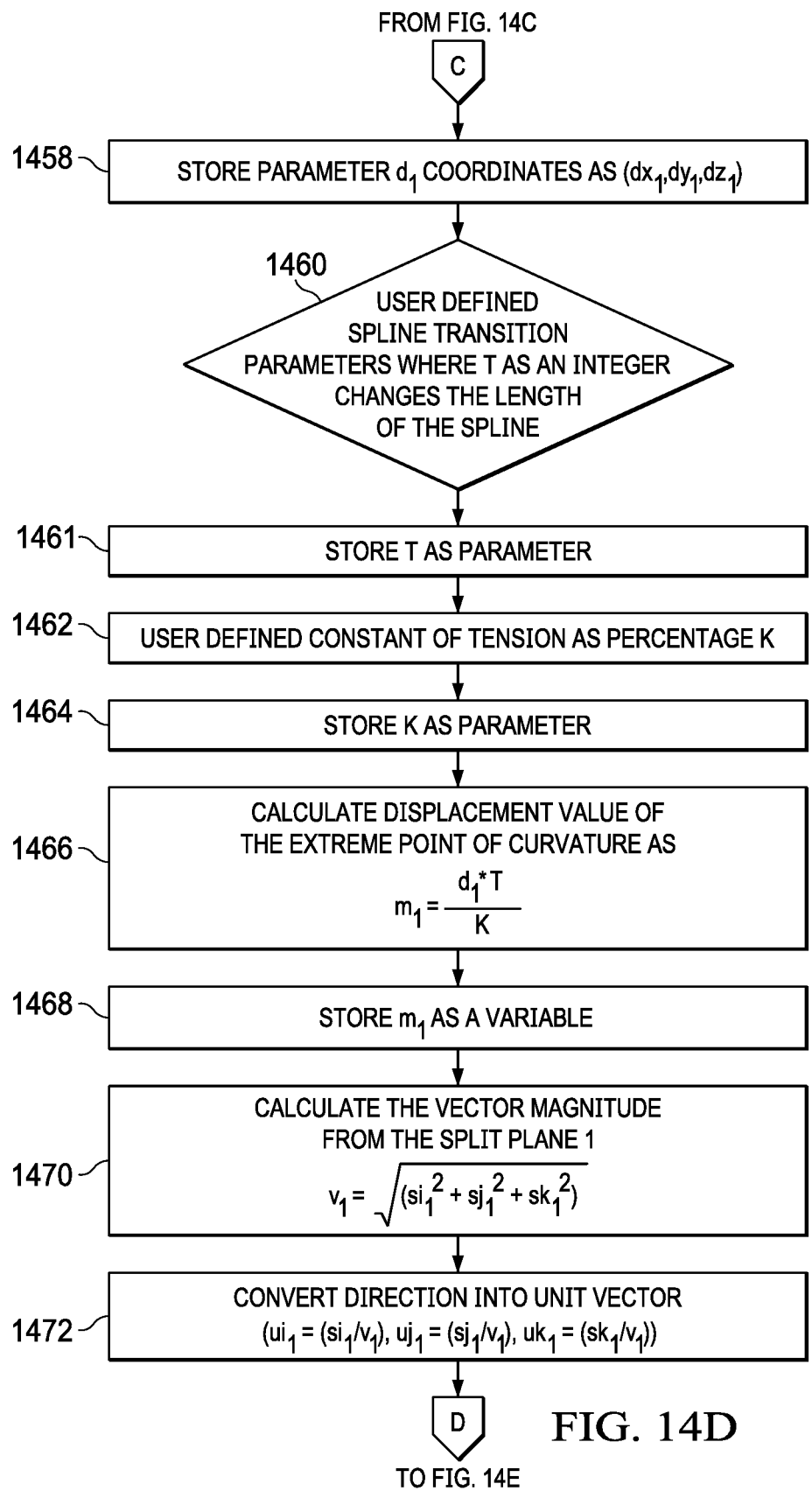
Figure 14E:
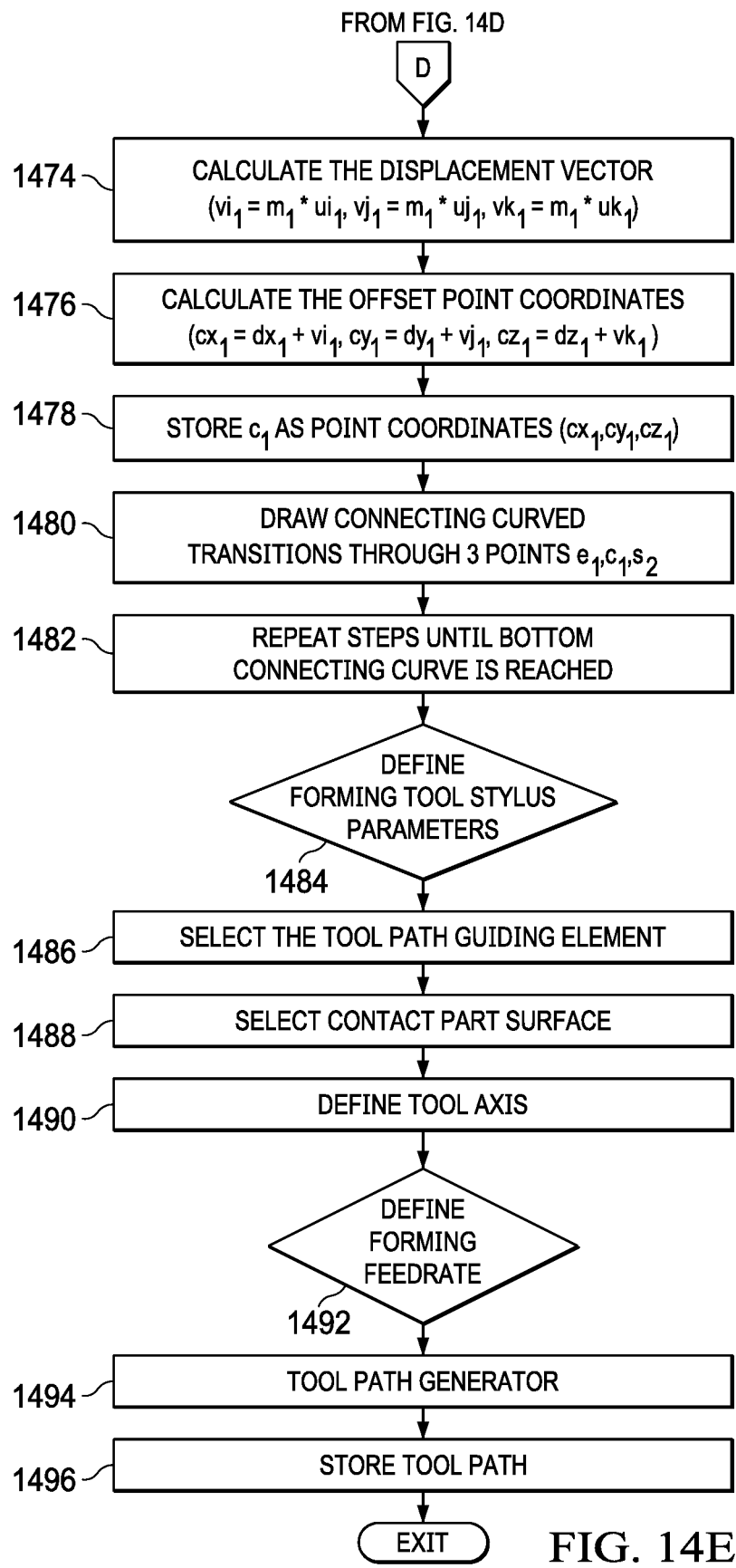

Turning now to FIG. 13, an illustration of a side view of forming tool is depicted in accordance with an illustrative example. Forming tool 1300 is a physical implementation of forming tool 114 of FIG. 1. Forming tool 1300 may be driven along tool path 1202 of FIG. 12.

Forming tool 1300 has nominal diameter (D) 1302, corner radius (Rc) 1304, overall length (L) 1306, forming length (Lc) 1308, length with transition (l) 1310, body diameter (db) 1312. At least one of nominal diameter (D) 1302, corner radius (Rc) 1304, overall length (L) 1306, forming length (Lc) 1308, length with transition (l) 1310, or body diameter (db) 1312 may be used as a parameter to be taken into account when forming a tool path, such as tool path 118.

After generating plurality of curved transitions connecting planar parallel alternating paths, parameters of forming tool 1300 are taken into account to form a tool path, such as tool path 118, such that forming tool 1300 contacts the surface of the part along the plurality of curved transitions and planar parallel alternating paths. For example, parameters of forming tool 1300 are taken into account in operation 1484 of FIG. 14 to generate a tool path at operation 1494.

Turning now to FIGS. 14A, 14B, 14C, 14D, and 14E an illustration of a flowchart of a method for forming a toolpath having a plurality of curved transitions connecting planar parallel alternating paths for forming a workpiece in accordance with an illustrative example. Method 1400 may be performed to create tool path 118 of FIG. 1. Method 1400 may be a flowchart representation of the actions performed to create the views of plurality of layers 402, plurality of traces 504, plurality of paths 802 and other features depicted along with desired shape 200 in FIGS. 2-12.

Method 1400 receives a user defined top plane as a point and direction parameters (operation 1402). Method 1400 stores point data of absolute $(x_0, y_0, z_0, i_0, j_0, k_0)$ coordinates (operation 1404). Method 1400 receives a user defined bottom point normal to the direction of top plane as parameters (operation 1406). Method 1400 store point data of absolute $(x_1, y_1, z_1)$ coordinates (operation 1408).

Method 1400 calculates the normal length between top and bottom absolute points as a distance $d=\sqrt{(x_1-x_0)^2+(y_1-y_0)^2+(z_1-z_0)^2}$ (operation 1410). Method 1400 then stores parameter d (operation 1412).

Method 1400 receives a user input variable value of axial distance between passes, ad (operation 1414). Method then stores parameter ad (operation 1416).

Method 1400 calculates an integer parameter value of number of levels N=d/ad (operation 1418). Method 1400 then stores parameter N (operation 1420).

Method 1400 calculate offset parameters O=d/N (operation 1422). Method 1400 then stores parameter O (operation 1424).

Method 1400 finds intersection planes and points wherein the top Plane/Point is at $x_0, y_0, z_0, i_0, j_0, k_0$, wherein N quantities of planes with O distance from one another, and a bottom plane/point at $x_1, y_1, z_1, i_0, j_0, k_0$ (operation 1426). Method 1400 traces planar parallel intersection curves between where the intersection planes and design surface intersect to form a plurality of traces (operation 1428).

Method 1400 receives a user defined transition distance as parameter t (operation 1430). Method 1400 receives user defined start point transition location as point coordinates that reside on an uppermost trace, $s_1$ (operation 1432). Method 1400 stores $s_1$ coordinates as $sx_1, sy_1, sz_1, si_1, sj_1, sk_1$ (operation 1434). Method 1400 draws a first split plane whose orientation is normal through the plurality of traces and $s_2$ coordinates (operation 1436). Method 1400 draws a second split plane a distance of t from the first split plane along the trace (operation 1438).

Method 1400 splits the plurality of traces with the first split plane and the second split plane to remove portions of the plurality of traces between the first split plane and the second split plane (operation 1440).

Method 1400 follows a trace from $s_1$ until an end point is encountered as point location $e_1$ (operation 1442). Method 1400 stores $e_1$ coordinates as $ex_1, ey_1, ez_1$ (operation 1444). Method 1400 starts from $e_1$ point location and finds the nearest start point of a next trace as $s_2$ (operation 1446). Method 1400 stores $s_2$ coordinates as $sx_2, sy_2, sz_2$ (operation 1448).

Method 1400 follows trace from $s_2$ until an end point as point location $e_2$ (operation 1450). Method 1400 stores $e_2$ coordinates as $ex_2, ey_2, ez_2$ (operation 1452). Method 1400 repeats operations 1446 through 1452 until the bottom most trace of the plurality of traces is reached (operation 1454).

Method 1400 calculates an absolute value or modulus distance parameter value between $s_1$ and $e_1$ as d1: $d_1=\sqrt{(ex_1-sx_2)^2+(ey_1-sy_2)^2+(ez_1-sz_2)^2}$ (operation 1456). Method 1400 stores parameter $d_1$ coordinates as $dx_1, dy_1, dz_1$ (operation 1458).

Method 1400 receives user defined spline transition parameters where T, as an integer, changes the length of the spline (operation 1460). Method 1400 stores T as parameter (operation 1461).

Method 1400 receives user defined constant of tension as percentage K (operation 1462). Method 1400 stores K as parameter (operation 1464).

Method 1400 calculates displacement value of the extreme point of curvature as $m_1=(d_1*T)/K$ (operation 1466). Method 1400 stores $m_1$ as a variable (operation 1468).

Method 1400 calculates the vector magnitude from the first split plane, $v_1=\sqrt{(si1^2+sj1^2+sk1^2)}$ (operation 1470). Method 1400 converts direction into unit vector $$ui_1 = \left(\frac{si_1}{v_1}\right), uj_1 = \left(\frac{sj_1}{v_1}\right), uk_1 = \left(\frac{sk_1}{v_1}\right)$$

(operation 1472). Method 1400 calculates the displacement vector $v_{i1}=m_1*u_{i1}, v_{j1}=m_1*u_{j1}, v_{k1}=m u_{k1}$ (operation 1474).

Method 1400 calculates the coordinates $x_1=d_{x1}+v_{j1}, c_{y1}=d_{y1}+v_{j1}, c_{z1}=d_{z1}+v_{k1}$ (operation 1476). Method 1400 stores $c_1$ as point coordinates $(c_{x1}, c_{y1}, c_{z1})$ (operation 1478).

Method 1400 draws connecting curved transitions thru three points: $e_1$, $c_1$, and $s_2$ (operation 1480).

Method 1400 repeats operations 1466 through 1480 until the bottom connecting curve is reached (operation 1482). When the bottom connecting curve is reached, method 1400 has generated toolpath guiding elements. A tool path is generated taking into account the toolpath guiding elements as well as physical parameters of the forming tool and tool axis.

Method 1400 defines the forming tool stylus parameters (operation 1484). The forming tool stylus parameters may include any desirable parameters and any quantity of parameters. In some illustrative examples, the forming tool stylus parameters including any desirable parameters of the parameters of FIG. 13. Method 1400 selects the toolpath guiding elements (operation 1486). Method 1400 selects contact part surface (operation 1488). Method 1400 defines tool axis (operation 1490). Method 1400 defines forming feedrate (operation 1492). The forming feedrate is a speed at which the forming tool moves across the surface of the part. Method 1400 generates the tool path (operation 1494). Method 1400 stores the tool path (operation 1496). By storing the tool path, a text like document with locations as a readable file format. Afterwards, method 1400 terminates.

Figure 15A:
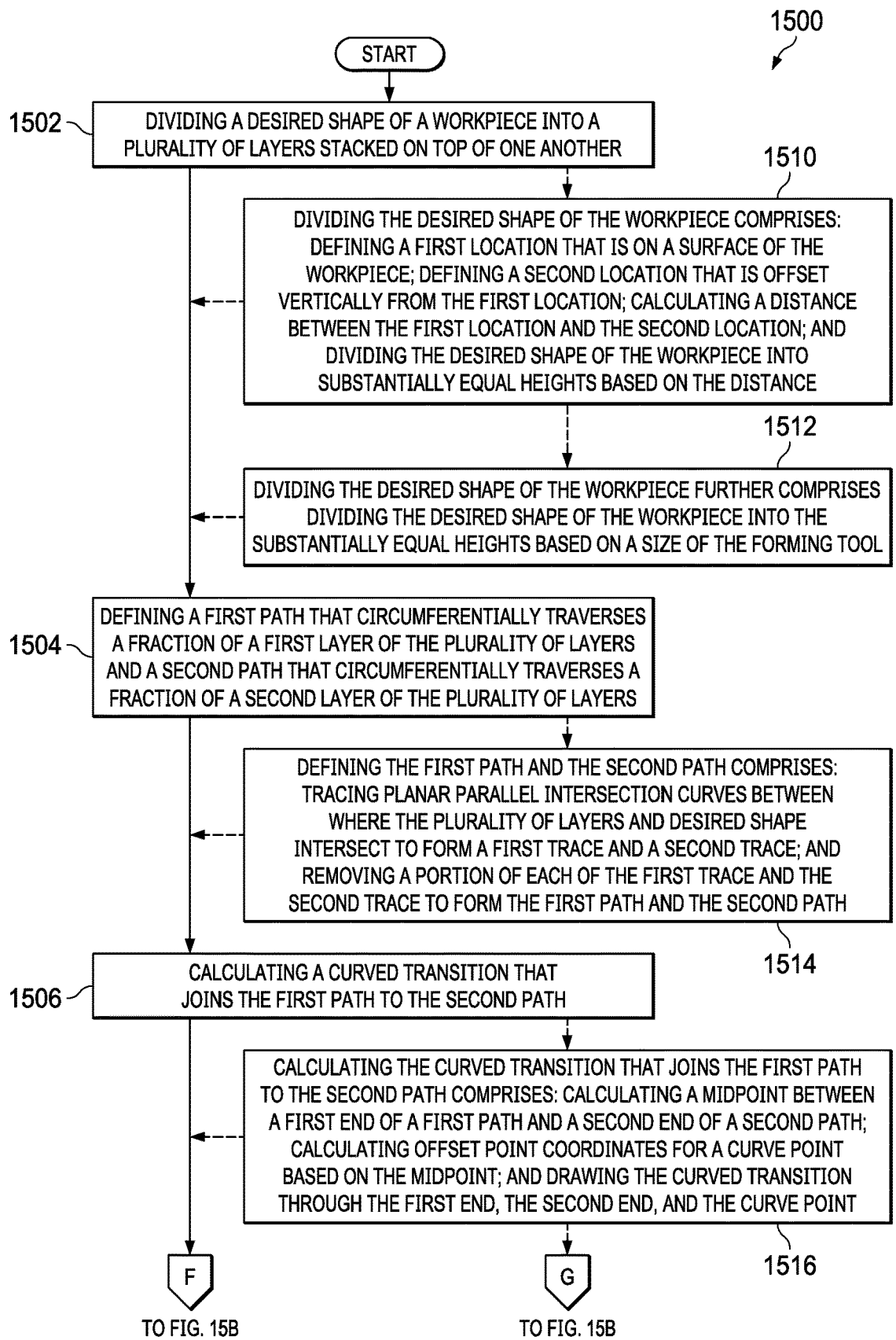
FIGS. 15A and 15B are an illustration of a flowchart of a method for shaping a material using a forming tool in accordance with an illustrative example.
Figure 15B:
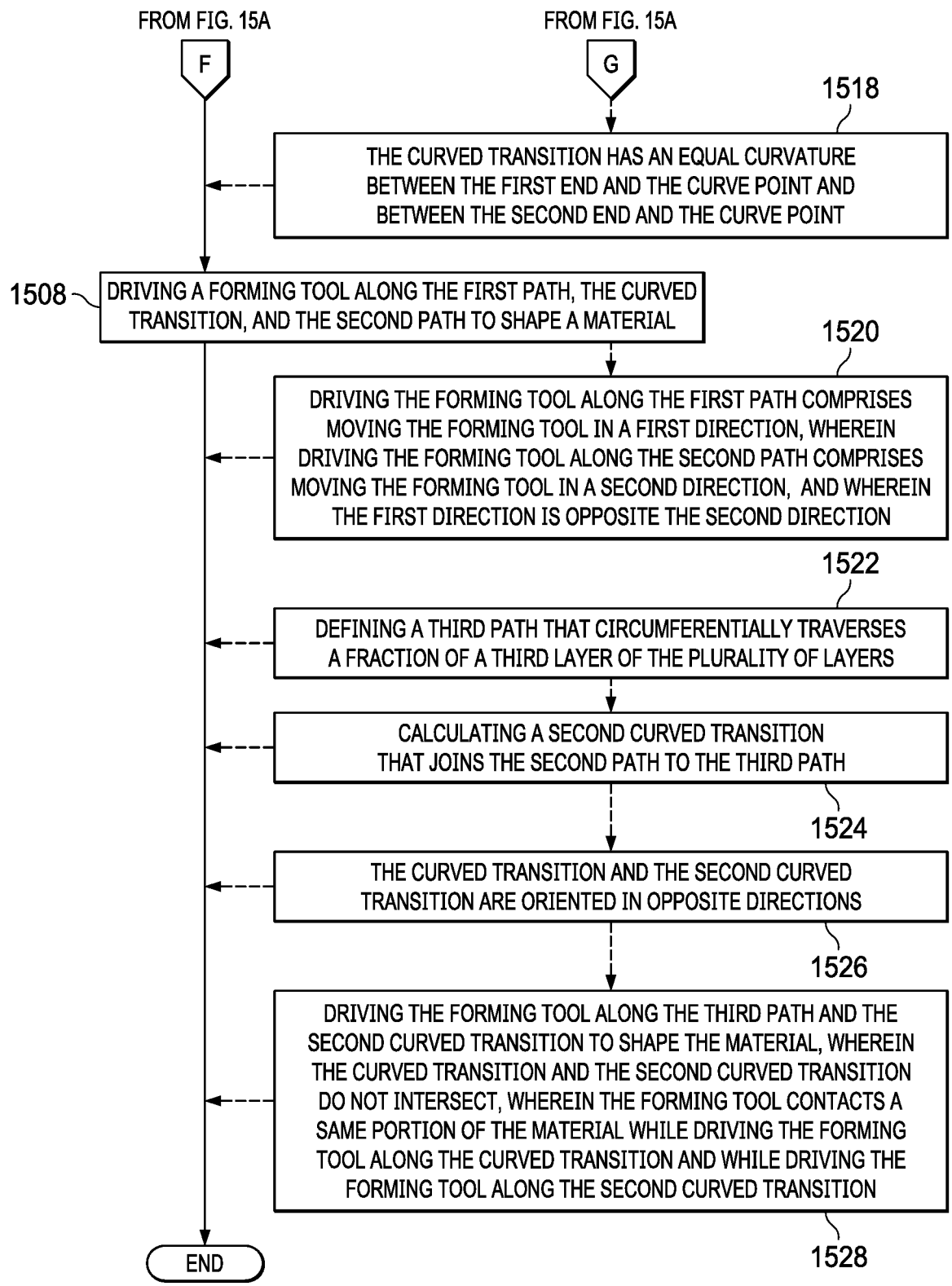

Turning now to FIGS. 15A and 15B, an illustration of a flowchart of a method for shaping a material using a forming tool is depicted in accordance with an illustrative example. Method 1500 may be used to shape material 106 with forming tool 115 of FIG. 1. Method 1500 may be performed using tool path generator 110 of FIG. 1 and forming tool 115 of FIG. 1. Method 1500 may be used to perform the actions used to create the views of plurality of layers 402, plurality of traces 504, plurality of paths 802 and other features depicted along with desired shape 200 in FIGS. 2-12.

Method 1500 divides a desired shape of a workpiece into a plurality of layers stacked on top of one another (operation 1502). Method 1500 defines a first path that circumferentially traverses a fraction of a first layer of the plurality of layers and a second path that circumferentially traverses a fraction of a second layer of the plurality of layers (operation 1504). Method 1500 calculates a curved transition that joins the first path to the second path (operation 1506). Method 1500 drives a forming tool along the first path, the curved transition, and the second path to shape a material into the workpiece (operation 1508). Afterwards, method 1500 terminates.

In some illustrative examples, method 1500 divides the desired shape of the workpiece comprises defining a first location that is on a surface of the workpiece, defining a second location that is offset vertically from the first location, calculating a distance between the first location and the second location, and dividing the desired shape of the workpiece into substantially equal heights based on the distance (operation 1510). In some illustrative examples, dividing the desired shape of the workpiece further comprises dividing the desired shape of the workpiece into the substantially equal heights based on a size of the forming tool (operation 1512).

In some illustrative examples, defining the first path and the second path comprises tracing planar parallel intersection curves between where the plurality of layers and the desired shape intersect to form a first trace and a second trace and removing a portion of each of the first trace and the second trace to form the first path and the second path (operation 1514). In some illustrative examples, the portion removed from each of the first trace and the second trace has a length equivalent to a trim distance.

In some illustrative examples, calculating the curved transition that joins the first path to the second path comprises calculating a midpoint between a first end of a first path and a second end of a second path, calculating coordinates for a curve point based on the midpoint, and drawing the curved transition through the first end, the second end, and the curve point (operation 1516). In some illustrative examples, the curved transition has an equal curvature between the first end and the curve point and between the second end and the curve point (operation 1518).

In some illustrative examples, driving the forming tool along the first path comprises moving the forming tool in a first direction, wherein driving the forming tool along the second path comprises moving the forming tool in a second direction, and wherein the first direction is opposite the second direction (operation 1520).

In some illustrative examples, method 1500 defines a third path that circumferentially traverses a fraction of a third layer of the plurality of layers (operation 1522). In some illustrative examples, method 1500 calculates a second curved transition that joins the second path to the third path (operation 1524).

In some illustrative examples, the curved transition and the second curved transition are oriented in opposite directions (operation 1526). In some illustrative examples, method 1500 drives the forming tool along the third path and the second curved transition to shape the material to form the workpiece, wherein the curved transition and the second curved transition do not intersect, wherein the forming tool contacts a same portion of the material while driving the forming tool along the curved transition and while driving the forming tool along the second curved transition (operation 1528).

Figure 16:
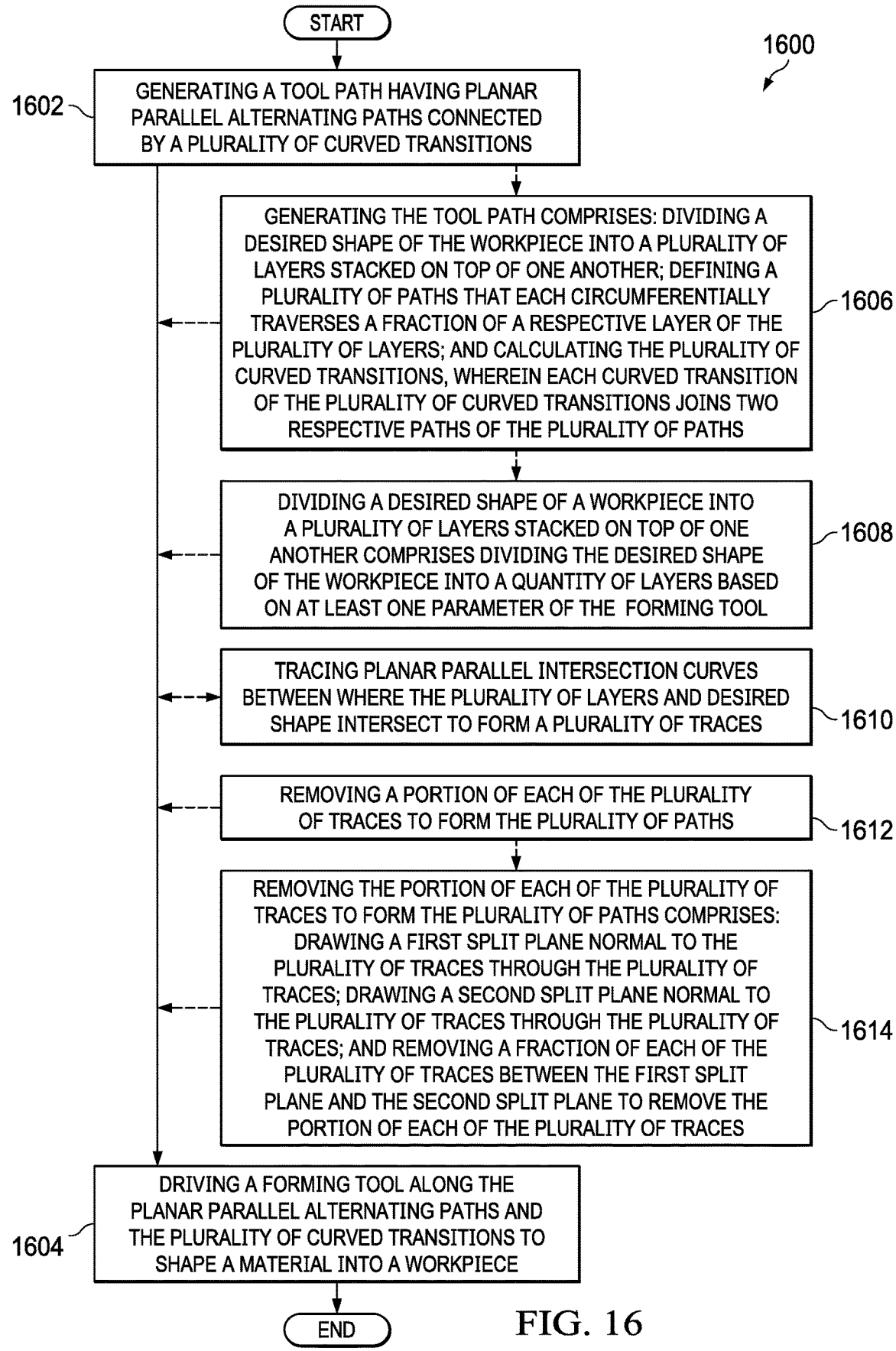
FIG. 16 is an illustration of a flowchart of a method for shaping a material using a forming tool in accordance with an illustrative example.

Turning now to FIG. 16, an illustration of a flowchart of a method for shaping a material using a forming tool is depicted in accordance with an illustrative example. Method 1600 may be used to shape material 106 with forming tool 114 of FIG. 1. Method 1600 may be performed using tool path generator 110 of FIG. 1 and forming tool 114 of FIG. 1. Method 1600 may be used to perform the actions used to create the views of plurality of layers 402, plurality of traces 504, plurality of paths 802 and other features depicted along with desired shape 200 in FIGS. 2-12.

Method 1600 generates a tool path having planar parallel alternating paths connected by a plurality of curved transitions (operation 1602). Method 1600 drives a forming tool along the planar parallel alternating paths and the plurality of curved transitions to shape a material into a workpiece (operation 1604). In some illustrative examples, the forming tool contacts a surface of all of the material of the workpiece. Afterwards, method 1600 terminates.

In some illustrative examples, generating the tool path comprises dividing a desired shape of the workpiece into a plurality of layers stacked on top of one another, defining a plurality of paths that each circumferentially traverses a fraction of a respective layer of the plurality of layers, and calculating the plurality of curved transitions, wherein each curved transition of the plurality of curved transitions joins two respective paths of the plurality of paths (operation 1606). In some illustrative examples, dividing the desired shape of the workpiece into the plurality of layers stacked on top of one another comprises dividing the desired shape of the workpiece into a quantity of layers based on at least one parameter of the forming tool (operations 1608).

Method 1600 tracing planar parallel intersection curves between where the plurality of layers and the desired shape intersect to form a plurality of traces (operation 1610). In some illustrative examples, method 1600 removes a portion of each of the plurality of traces to form the plurality of paths (operation 1612). In some illustrative examples, removing the portion of each of the plurality of traces to form the plurality of paths comprises drawing a first split plane normal to the plurality of traces through the plurality of traces, drawing a second split plane normal to the plurality of traces through the plurality of traces, and removing a component of each of the plurality of traces between the first split plane and the second split plane to remove the portion of each of the plurality of traces (operation 1614).

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1500 or method 1600 are performed. For example, operations 1510 through 1528 of FIG. 15 are optional. As another example, operations 1606 through 1614 of FIG. 16 are optional.

Figure 17:
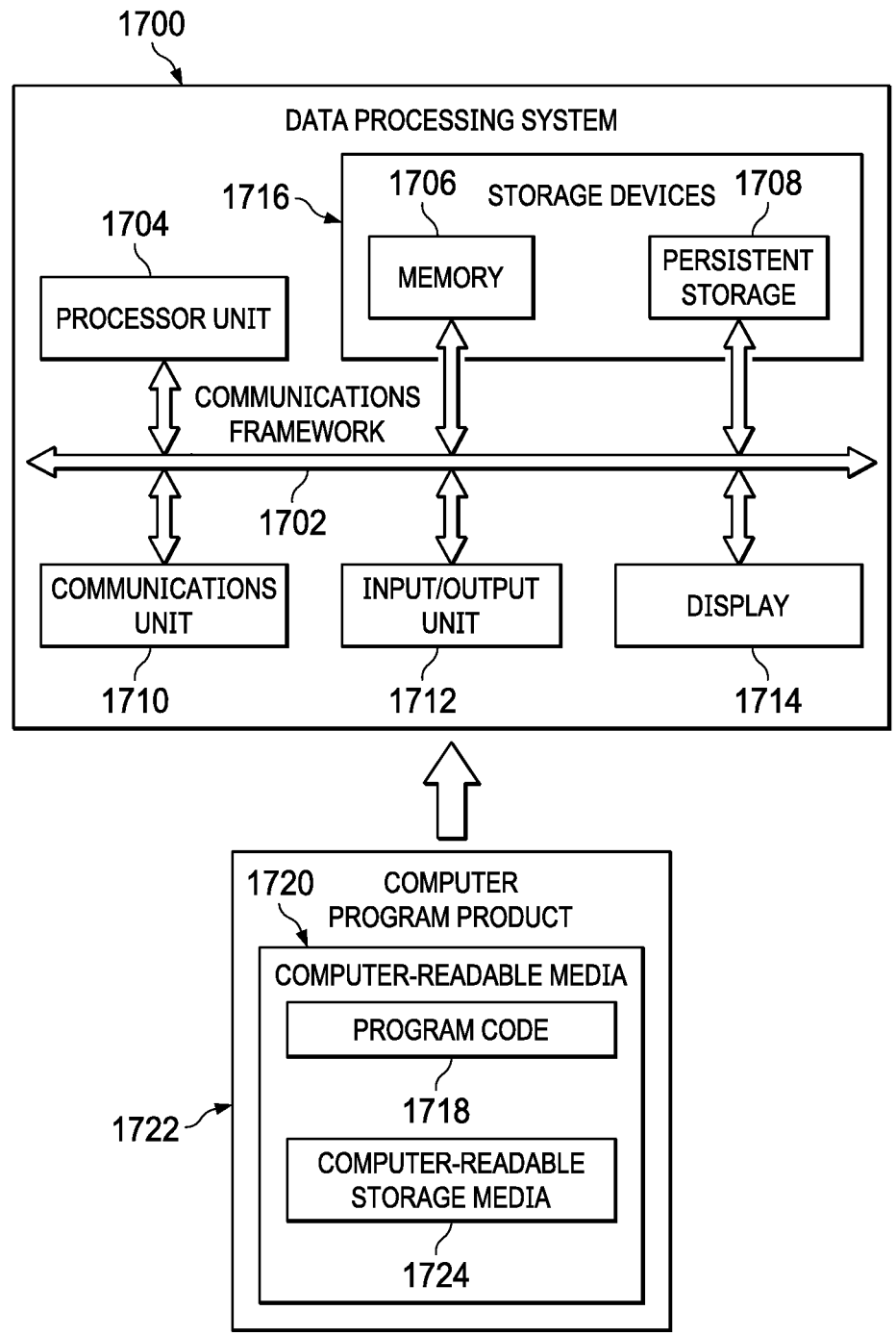
FIG. 17 is an illustration of a data processing system in the form of a block diagram in accordance with an illustrative example.

Turning now to FIG. 17, an illustration of a data processing system in the form of a block diagram is depicted in accordance with an illustrative example. Data processing system 1700 may be used to implement computer system 190 of FIG. 1.

Data processing system 1700 may be used to implement computer system 190 in FIG. 1. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer readable storage devices in these illustrative examples. Memory 1706, in these examples, may be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid state hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different examples may be performed by processor unit 1704 using computer-implemented instructions, which may be located in a memory, such as memory 1706.

These instructions are referred to as program code, computer usable program code, or computer readable program code that may be read and executed by a processor in processor unit 1704. The program code in the different examples may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these illustrative examples. In the illustrative example, computer readable media 1720 is computer readable storage media 1724.

In these illustrative examples, computer readable storage media 1724 is a physical or tangible storage device used to store program code 1718 rather than a medium that propagates or transmits program code 1718.

Alternatively, program code 1718 may be transferred to data processing system 1700 using a computer readable signal media. The computer readable signal media may be, for example, a propagated data signal containing program code 1718. For example, the computer readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different examples may be implemented. The different illustrative examples may be implemented in a data processing system including components in addition to or in place of those illustrated for data processing system 1700. Other components shown in FIG. 17 can be varied from the illustrative examples shown. The different examples may be implemented using any hardware device or system capable of running program code 1718.

Figure 18:
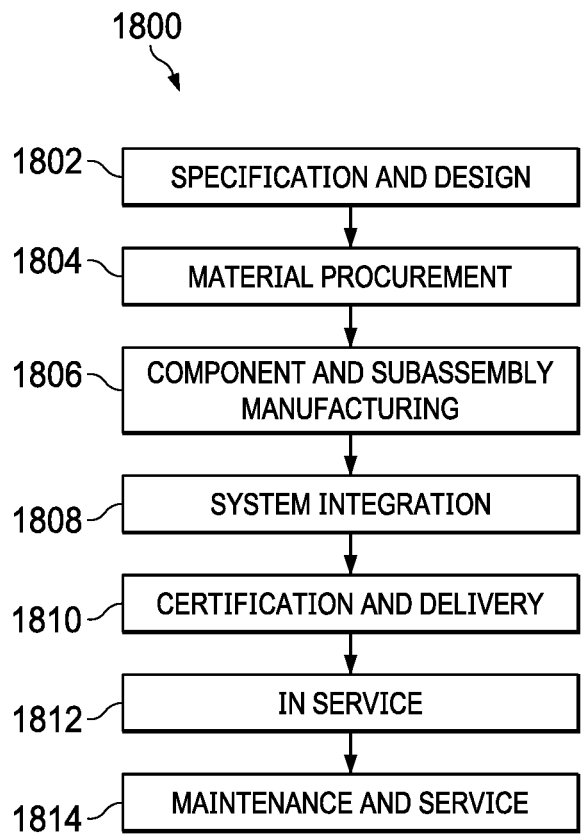
FIG. 18 is an illustration of an aircraft manufacturing and service method in the form of a block diagram in accordance with an illustrative example.
Figure 19:
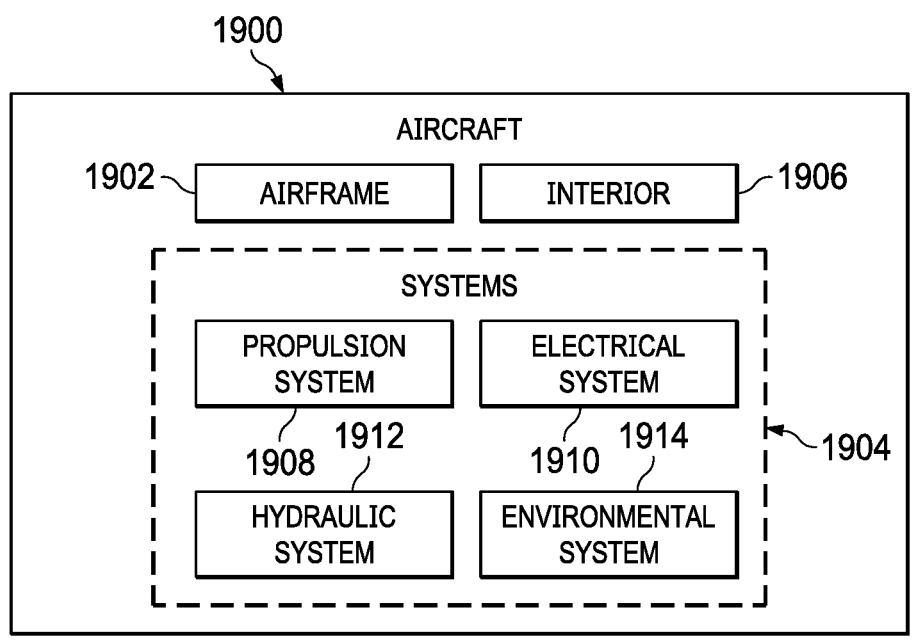
FIG. 19 is an illustration of an aircraft in the form of a block diagram in which an illustrative example may be implemented.

The illustrative examples of the present disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative example. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 takes place. Thereafter, aircraft 1900 may go through certification and delivery 1810 in order to be placed in service 1812. While in service 1812 by a customer, aircraft 1900 is scheduled for maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 19, an illustration of an aircraft is depicted in which an illustrative example may be implemented. In this example, aircraft 1900 is produced by aircraft manufacturing and service method 1800 in FIG. 18 and may include airframe 1902 with a plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1800. One or more illustrative examples may be used during component and subassembly manufacturing 1806, system integration 1808, or maintenance and service 1814 of FIG. 18. For example, tool path 118 formed by tool path generator 110 may be used to form workpiece 104 during component and subassembly manufacturing 1806. As another example, workpiece 104 may be a replacement part and tool path 118 formed by tool path generator 110 may be used to form workpiece 104 during maintenance and service 1814 of FIG. 18.

Apparatuses and methods embodied herein may be employed in manufacturing at least one component of aircraft 1900. For example, workpiece 104 formed using tool path 118 may be a component of one of airframe 1902 or interior 1906.

The illustrative examples provide a system and methods for continuous toolpath motion with bi-directional capability. The illustrative examples present a universal solution to computer software utility programs such as a tool path manufacturing workbench, computer-aided design (CAD), computer-aided manufacturing (CAM), and computer-aided engineering (CAE).

The illustrative examples provide smooth alternating transition areas with a curved, rather than linear transition. The tool path produced using the illustrative examples eliminates multiple engage and retracts during forming. The tool path produced using the illustrative examples includes smooth continuous contacted tool path motion.

The illustrative examples improve distortion in workpieces over conventional machining algorithms. The illustrative examples generate a high quality surface during ISF operations. The illustrative examples also adapt to complex geometries.

The illustrative examples present a method for generating continuous alternating curved transitions with mixed bi-directional tool paths. The tool path method generates a high quality surface, improved distortion properties, and an alternating transition area during ISF operations that increases efficiency. The toolpath method can adapt to complex design geometry with bi-directional capability and provide an optimal transition method in a single algorithm. A basic user can quickly implement the presented methods with no additional software development, lead time, or fees to fix a complex problem.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
    dividing a desired shape of a workpiece from a three-dimensional computer model into a plurality of layers stacked on top of one another;
    defining a first path that circumferentially traverses a fraction of a first layer of the plurality of layers and a second path that circumferentially traverses a fraction of a second layer of the plurality of layers;
    calculating a curved transition that joins the first path to the second path;
    generating, by a tool path generator of a computer system, a tool path containing the first path, second path, and the curved transition;
    driving a forming tool, by a controller of the computer system, along the tool path containing the first path, the curved transition, and the second path to shape a material into the workpiece, wherein driving the forming tool along the first path comprises moving the forming tool in a first direction, wherein driving the forming tool along the second path comprises moving the forming tool in a second direction, and wherein the first direction is opposite the second direction;
    defining a third path that circumferentially traverses a fraction of a third layer of the plurality of layers;
    calculating a second curved transition that joins the second path to the third path, wherein the curved transition and the second curved transition are oriented in opposite directions; and
    driving the forming tool along the third path and the second curved transition to shape the material into the workpiece, wherein the curved transition and the second curved transition do not intersect, wherein the forming tool contacts a same portion of the material while driving the forming tool along the curved transition and while driving the forming tool along the second curved transition.

2. The method of claim 1, wherein dividing the desired shape of the workpiece comprises:

defining a first location that is on a surface of the workpiece;

defining a second location that is offset vertically from the first location;

calculating a distance between the first location and the second location; and dividing the desired shape of the workpiece into substantially equal heights based on the distance.

3. The method of claim 2, wherein dividing the desired shape of the workpiece further comprises dividing the desired shape of the workpiece into the substantially equal heights based on a size of the forming tool.

4. The method of claim 1, wherein defining the first path and the second path comprises:

tracing planar parallel intersection curves between where the plurality of layers and the desired shape intersect to form a first trace and a second trace; and removing a portion of each of the first trace and the second trace to form the first path and the second path.

5. The method of claim 4, wherein the portion removed from each of the first trace and the second trace has a length equivalent to a trim distance.

6. The method of claim 1, wherein calculating the curved transition that joins the first path to the second path comprises:

calculating a midpoint between a first end of a first path and a second end of a second path;

calculating coordinates for a curve point based on the midpoint; and drawing the curved transition through the first end, the second end, and the curve point.

7. The method of claim 6, wherein the curved transition has an equal curvature between the first end and the curve point and between the second end and the curve point.

8. A method comprising:

generating a tool path having planar parallel alternating paths connected by a plurality of curved transitions by a tool path generator in a computer system, wherein the planar parallel alternating paths comprise a first path that circumferentially traverses a fraction of a first layer of a desired shape of a workpiece of a three-dimensional computer model, a second path that circumferentially traverses a fraction of a second layer of the three-dimensional computer model, and a third path that circumferentially traverses a fraction of a third layer of the three-dimensional computer model, wherein the plurality of curved transitions comprise a curved transition that joins the first path to the second path and a second curved transition that joins the second path to the third path, wherein the curved transition and the second curved transition are oriented in opposite directions, wherein the curved transition and the second curved transition do not intersect; and driving a forming tool using the tool path, by a controller of the computer system, along the planar parallel alternating paths and the plurality of curved transitions to shape a material into a workpiece, wherein the forming tool contacts a same portion of the material while driving the forming tool along the curved transition and while driving the forming tool along the second curved transition.

9. The method of claim 8, wherein generating the tool path comprises:

dividing a desired shape of the workpiece into a plurality of layers stacked on top of one another;

defining a plurality of paths that each circumferentially traverses a fraction of a respective layer of the plurality of layers; and calculating the plurality of curved transitions, wherein each curved transition of the plurality of curved transitions joins two respective paths of the plurality of paths.

10. The method of claim 9 further comprising:

tracing planar parallel intersection curves between where the plurality of layers and the desired shape intersect to form a plurality of traces; and removing a portion of each of the plurality of traces to form the plurality of paths.

11. The method of claim 10, wherein removing the portion of each of the plurality of traces to form the plurality of paths comprises:

drawing a first split plane normal to the plurality of traces through the plurality of traces;

drawing a second split plane normal to the plurality of traces through the plurality of traces; and removing a component of each of the plurality of traces between the first split plane and the second split plane to remove the portion of each of the plurality of traces.

12. The method of claim 9, wherein dividing the desired shape of the workpiece into the plurality of layers stacked on top of one another comprises dividing the desired shape of the workpiece into a quantity of layers based on at least one parameter of the forming tool.

13. The method of claim 8, wherein the forming tool contacts all of a surface of the workpiece.

14. A system comprises:

a three-dimensional computer model for a workpiece comprising a desired shape of the workpiece;

a tool path generator in a computer system, the tool path generator configured to:

divide the desired shape of the workpiece into a plurality of layers stacked on top of one another, define a plurality of alternating paths that each circumferentially traverses a fraction of a respective layer of the plurality of layers including a first path that circumferentially traverses a fraction of a first layer of the plurality of layers, a second path that circumferentially traverses a fraction of a second layer of the plurality of layers, and a third path that circumferentially traverses a fraction of a third layer of the plurality of layers, calculate a plurality of curved transitions, wherein each curved transition of the plurality of curved transitions joins two respective alternating paths of the plurality of alternating paths including calculating a curved transition that joins the first path to the second path and calculating a second curved transition that joins the second path to the third path, wherein the curved transition and the second curved transition are oriented in opposite directions, and generating a tool path containing the plurality of alternating paths and the plurality of curved transitions;

a controller in the computer system, the controller in communication with the tool path generator, wherein the controller is configured to receive the tool path from the tool path generator, wherein the controller is configured to drive a forming tool along the plurality of alternating paths and the plurality of curved transitions to shape a material into the workpiece wherein driving the forming tool includes driving the forming tool along the tool path containing the first path, the curved transition, and the second path to shape a material into the workpiece, wherein driving the forming tool along the first path comprises moving the forming tool in a first direction, wherein driving the forming tool along the second path comprises moving the forming tool in a second direction, and wherein the first direction is opposite the second direction, and driving the forming tool further including driving the forming tool along the third path and the second curved transition to shape the material into the workpiece, wherein the curved transition and the second curved transition do not intersect, wherein the forming tool contacts a same portion of the material while driving the forming tool along the curved transition and while driving the forming tool along the second curved transition; and the forming tool in communication with the controller.

15. The system of claim 14, wherein the forming tool is a component of an incremental sheet forming assembly.

16. The method of claim 9, wherein calculating the plurality of curved transitions comprises:

calculating a midpoint between a first end of a first respective path of the plurality of paths and a second end of a second respective path of the plurality of paths;

calculating coordinates for a curve point based on the midpoint; and drawing a curved transition through the first end, the second end, and the curve point.

17. The method of claim 16, wherein the curved transition has an equal curvature between the first end and the curve point and between the second end and the curve point.

18. The method of claim 1, wherein driving the forming tool, by the controller of the computer system, is part of an incremental sheet forming process to shape the material into the workpiece.

19. The method of claim 8, wherein driving the forming tool, by the controller of the computer system, is part of an incremental sheet forming process to shape the material into the workpiece.

20. The method of claim 9, wherein dividing the desired shape of the workpiece into the plurality of layers stacked on top of one another comprises dividing the desired shape of the workpiece into substantially equal heights based on a size of the forming tool.

* * * * *